US012807825B2

(12) United States Patent
Virkar et al.

(10) Patent No.: US 12,807,825 B2
(45) Date of Patent: Nov. 24, 2026

(54) SILVER NANOWIRE BASED, ELECTRICALLY CONDUCTIVE INKS, PASTES AND ELECTRICALLY CONDUCTIVE POLYMER COMPOSITES WITH METAL PARTICULATES, AND CORRESPONDING METHODS

(71) Applicant: EKC Technology, Inc., Hayward, CA (US)

(72) Inventors: Ajay Virkar, San Mateo, CA (US); Xiqiang Yang, Hayward, CA (US); Nazim Uddin, Hayward, CA (US); Tuan T. D. Nguyen, El Cerrito, CA (US); Amir Tork, Hayward, CA (US); Jiteng Xu, Hayward, CA (US); Xinxing Liu, Fremont, CA (US); Ying-Syi Li, Fremont, CA (US)

(73) Assignee: EKC Technologies, Inc., Hayward, CA (US)

( * ) Notice: Subject to any disclaimer, the term of this patent is extended or adjusted under 35 U.S.C. 154(b) by 101 days.

(21) Appl. No.: 18/899,760

(22) Filed: Sep. 27, 2024

(65) Prior Publication Data

US 2025/0101238 A1 Mar. 27, 2025

Related U.S. Application Data

(60) Provisional application No. 63/540,772, filed on Sep. 27, 2023.

(51) Int. Cl.
*C09D 5/24* (2006.01)
*C09D 4/00* (2006.01)
(Continued)

(52) U.S. Cl.
CPC ................. *C09D 5/24* (2013.01); *C09D 4/00* (2013.01); *C09D 7/20* (2018.01); *C09D 7/61* (2018.01);
(Continued)

(58) Field of Classification Search
CPC ... C09D 5/24; C09D 4/00; C09D 7/20; C09D 7/61; C09D 7/68; C09D 7/69; C09D 7/70;
(Continued)

(56) References Cited

U.S. PATENT DOCUMENTS 9,150,746 B1 * 10/2015 Li .......................... C09D 11/10
9,530,534 B2 12/2016 Hu et al.
(Continued)

FOREIGN PATENT DOCUMENTS

EP 2487215 B1 * 7/2013 ............ C09J 163/00
EP 4249148 A1 * 9/2023 ............ B22F 1/0545
WO WO-2018019813 A1 * 2/2018 ........... C09D 11/037

OTHER PUBLICATIONS

Wang et al., "A Comprehensive Study of Silver Nanowires Filled Electrically Conductive Adhesives," Journal of Materials Science: Materials in Electronics, vol. 26 No. 10, (Jul. 2015). (Abstract Only).
(Continued)

*Primary Examiner* — Mark Kopec
*Assistant Examiner* — Jaison P Thomas
(74) *Attorney, Agent, or Firm* — Christensen, Fonder, Dardi PLLC; Elizabeth A. Gallo.; Peter S. Dardi

(57) ABSTRACT

Concentrated flowable compositions having a total metal weight of at least about 45 wt % are used to form an electrically conductive material. The compositions include metal particulates such as silver flakes, silver particles and/or silver nanowires, and for embodiments of particular
(Continued)

Composite S-13 = 44 wt% AgFL + 15 wt% AgMP + 20 wt% HNW + 2.5 wt% AgAc interest, a reducible metal composition such as one or more silver salts. The composition includes an organic precursor that forms a polymeric matrix and includes a dissolved polymer binder, a crosslinkable or polymerizable monomer, oligomer or polymer, or a mixture thereof. The flowable precursor composition can be used to form an electrically conductive structure such as a composite of solid polymer matrix and at least about 45 wt % metal. The composite can have a resistivity of no more than about $5\times10^{-3}$ Ohm-cm. Methods for forming the flowable precursor composition and the composites are described.

27 Claims, 11 Drawing Sheets

(51) Int. Cl.

| | |
|---|---|
| ***C09D 7/20*** | (2018.01) |
| ***C09D 7/40*** | (2018.01) |
| ***C09D 7/61*** | (2018.01) |
| ***C09D 133/16*** | (2006.01) |
| ***C09D 163/08*** | (2006.01) |
| *C08K 3/08* | (2006.01) |
| *C08K 7/06* | (2006.01) |

(52) U.S. Cl.
CPC ................. *C09D 7/68* (2018.01); *C09D 7/69* (2018.01); *C09D 7/70* (2018.01); *C09D 133/16* (2013.01); *C09D 163/08* (2013.01); *C08K 2003/0806* (2013.01); *C08K 7/06* (2013.01); *C08K 2201/001* (2013.01); *C08K 2201/003* (2013.01); *C08K 2201/004* (2013.01); *C08K 2201/016* (2013.01)

(58) Field of Classification Search
CPC ...... C09D 133/16; C09D 163/08; C08K 7/06; C08K 2003/0806; C08K 2201/001; C08K 2201/003; C08K 2201/004; C08K 2201/016
See application file for complete search history.

(56) References Cited

U.S. PATENT DOCUMENTS

| | | | |
|---|---|---|---|
| 9,920,207 B2 | 3/2018 | Virkar et al. | |
| 10,020,807 B2 | 7/2018 | Virkar et al. | |
| 10,029,916 B2 | 7/2018 | Virkar et al. | |
| 10,714,230 B2 | 7/2020 | Hu et al. | |
| 11,084,950 B2 | 8/2021 | Graddy, Jr. et al. | |
| 2006/0043346 A1* | 3/2006 | Kodas | H01C 17/06506 257/E21.174 |
| 2007/0104875 A1* | 5/2007 | Kodas | H05K 3/105 252/500 |
| 2011/0291032 A1 | 12/2011 | Sun et al. | |
| 2012/0168684 A1 | 7/2012 | Magdassi et al. | |
| 2013/0224474 A1 | 8/2013 | Theunissen et al. | |
| 2014/0178601 A1 | 6/2014 | Wei et al. | |
| 2015/0262728 A1 | 9/2015 | Ogiwara | |
| 2016/0032127 A1 | 2/2016 | Li et al. | |
| 2016/0114390 A1 | 4/2016 | Hori et al. | |
| 2023/0416552 A1* | 12/2023 | Yang | C09D 11/52 |
| 2024/0257991 A1 | 8/2024 | Yang et al. | |
| 2024/0290516 A1 | 8/2024 | Virkar et al. | |

OTHER PUBLICATIONS

Zhang et al., "Electrically Conductive Adhesives with Sintered Silver Nanowires," 2009 International Conference on Electronic Packaging Technology & High Density Packaging (ICEPT-HDP) 978-1-4244-4659-9/09 (2009). (Abstract Only).

PCTUS2024048915 International Search Report Jan. 9, 2025. 2 pages.

* cited by examiner debris from composite
related to cutting process no debris or residue from composite debris from composite
related to cutting process no debris or residue from composite Composite S-13 = 44 wt% AgFL + 15 wt% AgMP + 20 wt% HNW + 2.5 wt% AgAc

SILVER NANOWIRE BASED, ELECTRICALLY CONDUCTIVE INKS, PASTES AND ELECTRICALLY CONDUCTIVE POLYMER COMPOSITES WITH METAL PARTICULATES, AND CORRESPONDING METHODS

CROSS REFERENCE TO RELATED APPLICATIONS

This application claims priority to U.S. provisional patent application 63/540,772 filed on Sep. 27, 2023 to Virkar et al., entitled "Silver Nanowire Based, Electrically Conductive Inks, Pastes and Electrically Conductive Adhesives and Corresponding Methods," incorporated herein by reference.

FIELD OF THE INVENTION

The invention relates to electrically conductive composite material comprising polymer and metal particulates, such as silver nanowires. The invention further relates to supplementing electrical conductivity of the conductive composites with in situ reduced silver for forming a cured composite material. The invention also related to methods for forming these composites.

BACKGROUND OF THE INVENTION

Metal loaded polymers (e.g., crosslinked polymers) have been found to provide a useful alternative to solder and other metal only electrical connector materials. The conductive structures can be formed through the deposition of suitable precursor materials, which can be pastes or more fluid inks and which may comprise, for example, monomers, oligomers, dissolved polymers, solvents mixtures thereof, or the like. Particulate metal, such as silver nanoparticles or silver flakes, can be used as the metal fillers. Silver is the most electrically conductive metal, although other metals can provide sufficient electrical and thermal conductivity. These materials can be conveniently applied in various processing contexts.

SUMMARY OF THE INVENTION

In a first aspect, the invention pertains to a flowable precursor composition for forming an electrically conductive material that has a total metal weight of at least about 45 wt % relative to a total weight of the composition and at least about 2 wt % organic precursor for forming a polymer matrix. The flowable precursor composition can be used to form an electrically conductive material. The composition comprises metal particulates such as silver flakes and/or silver particles and a reducible metal composition such as one or more silver salts. The metal particulates can also comprise metal nanowires such as silver nanowires. The composition comprises an organic precursor that forms a polymeric matrix. The precursor can comprise a dissolved polymer binder, a crosslinkable or polymerizable monomer, oligomer or polymer, or a mixture thereof. For example, the precursor may comprise one or more monomers such as (meth)acrylate monomers, hydroxy and/or epoxy functionalized urethane acrylate monomers, and monomers for forming epoxy resins. The precursor may be thermally and/or UV curable.

In another aspect, the invention pertains to a flowable precursor composition for forming an electrically conductive structure comprising an organic precursor for a polymer matrix; and metal particulates comprising silver nanowires and metal particles that are not nanowires, wherein the metal particulates comprise from about 5 wt % to about 90 wt % silver nanowires relative to a total weight of the metal particulates. The metal particles that are not nanowires can comprise silver flakes, silver particles or a combination thereof.

In another aspect, the invention pertains to a composite electrically conductive material formed from the flowable precursor composition. The composite comprises a solid polymer matrix and at least about 45 wt % metal, wherein the metal comprises: a1) features formed from metal particulates that are not nanowires and b1) features formed from silver nanowires, from deposited metal from a reduced metal composition, or from both; or a2) structures formed from silver nanowires and b2) deposited metal from reduced metal compositions. The composite electrically conductive material can have a resistivity of no more than about $5\times10^{-3}$ Ohm-cm.

In another aspect, the invention pertains to a method for forming a precursor composition for forming an electrically conductive composite material. The method comprises: combining a) a polymer matrix precursor that comprises a crosslinkable polymer precursor, polymerizable monomers/oligomers, a dissolved polymer binder, or combination thereof, and b) a metal component provided as two or more of 1) metal particulates that are not nanowires, 2) silver nanowires, or 3) a reducible metal composition, to form the precursor composition, and wherein the precursor composition comprises at least about 45 wt % total metal in all forms and wherein if the metal is provided as only silver nanowire and a reducible metal composition, the polymer matrix comprises at least 2 wt %, and in some embodiments 8.5 wt %, of the polymer matrix precursor composition following curing.

In another aspect, the invention pertains to a method for forming a composite material having high electrical conductivity and organic polymer and metal constituents. The method comprises: curing a deposited composition to drive reduction of silver ions to form silver metal, wherein the deposited material is a precursor composition comprising polymer precursors, silver particulates, and dissolved silver composition and wherein curing comprises application of heat, UV radiation or both for sufficient time to reduce the silver ions to silver metal and decrease resistivity by at least about 25%.

DETAILED DESCRIPTION

Figure 1:
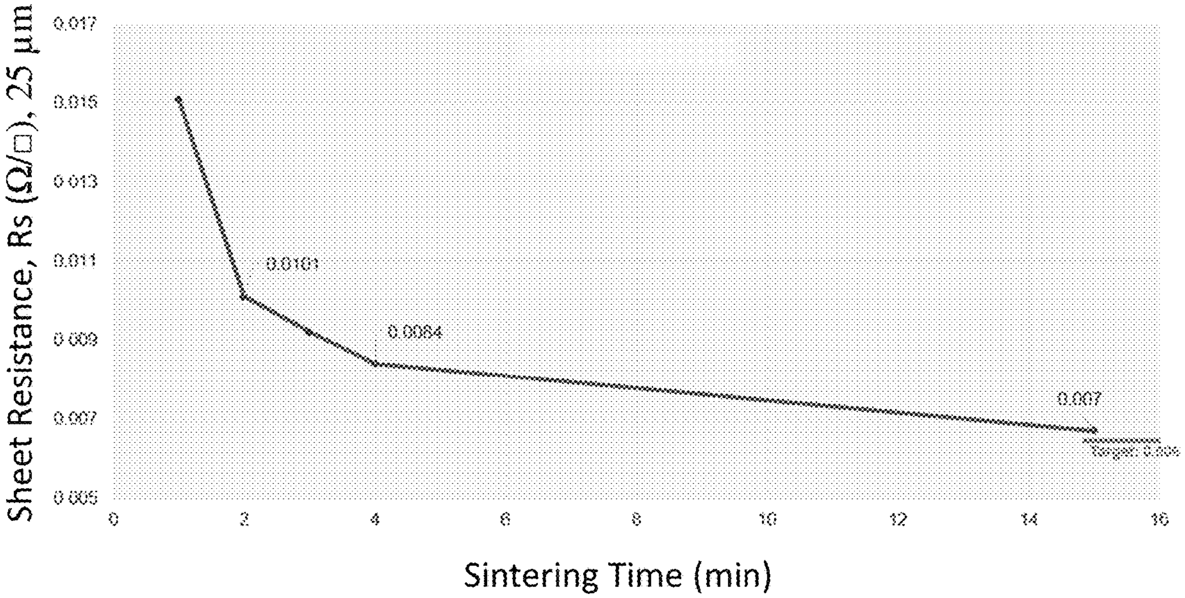
FIG. 1 is a plot of calculated sheet resistance as a function of sintering time at 250° C. for a composite including about 19 wt % H-nanowires (HNW), about 41 wt % silver flakes (AgFL), about 14 wt % silver macroparticles (AgMP) and about 7 wt % silver trifluoroacetate (AgTFA) in a UV cured urethane acrylate polymer matrix.

Silver nanowires have been found to further improve electrical conductivity for metal loaded polymers and resins having a high metal loading based on the ability to achieve very low resistivities while maintaining desirable properties imparted by the polymer. The effect of the silver nanowires can be disproportionate to their mass of silver due to the electrical conduction pathways provided by the nanowire morphology. It has been discovered how to avoid rheological limits for obtaining high loadings of silver nanowires in solvents and loaded polymers. The combination of silver nanowires with other metal shapes can adapt the properties of the material while improving the electrical conductivity. Additionally or alternatively, the use of reducible metal compounds can provide significant improvements in electrical conductivity based on any base metal particulate shapes. Reducible metal salts are found to be beneficial even when used in composites that do not have silver nanowires, although blends with some silver nanowires can be desirable. The decreases in electrical resistivity achieved with the reduced silver salts is disproportionate with the amount of metal deposited, which suggests some effectively directed metal deposition supportive of establishing electrically conductive pathways through the material. Similarly, silver nanowires can help to establish electrically conductive pathways based on their length. A curing process can be used that solidifies the polymer matrix through polymerization, crosslinking, solvent removal, silver ion reduction, combinations thereof and the like. The improved electrical conductivity can provide for reduced material usage in high performance applications, such as personal electronic devices, while providing good processability. Very low resistivities are achievable with the composites described herein. The materials can be engineered for specific properties desired for particular applications. A wide range of polymer precursors, such as dissolved polymer, or monomer and/or oligomer resins, can be used. The use of environmentally friendly metals provides for a more environmentally benign alternative to conventional solders and the like for providing electrical connections or other applications such as antistatic agents.

The nature of the materials described herein is clear for those of ordinary skill in the art. The terminology though may not be uniformly adopted in the art. While due care is taken to explain alternative terminology, it may not be comprehensive, and a person of ordinary skill in the art can make appropriate connections based on the overall discussion presented herein in the appropriate context.

The processing herein involves the formation of a precursor composition that is deposited for forming the ultimate electrically conductive structure. The conductive polymer precursor composition may alternatively be referred to as an ink, as a paste, as a precursor material, as a conductive adhesive, or as a resin loaded with metal particulates, although other terminology may be used in the art for comparable compositions. The precursor composition has the common feature of being depositable, either as a coating, a dispensable composition, a printed structure, spreadable paste, or the like, and the rheology of the composition can vary depending on the deposition approach.

Following deposition of precursor composition, the material is cured. As used herein, curing is used broadly in the sense of converting a flowable, which includes freely pourable as well as spreadable, precursor composition to a solid conductive material and is not intended to imply any specific chemical reactions unless separately described. Thus, as used herein, curing can refer to solvent removal, polymerizing and/or crosslinking of the precursor composition, reduction of metal compositions, combinations thereof, or the like. In some embodiments, the curing process generally is influenced by the process to polymerize and/or crosslink the precursor composition. In additional or alternative embodiments, the incorporation of a reducible metal composition can also influence the process conditions. Curing may involve evaporation of solvent, which may or may not involve heat. Some polymer binders can be used in precursor compositions, where the polymer binders are dissolved in solvent to form the precursor composition and solvent removal solidifies the polymer binder and composite electrically conductive structure without necessarily crosslinking the polymer. Polymer binders can also be formed by polymerization during curing with no crosslinking, some crosslinking or high crosslinking. For crosslinking systems, the initial precursor composition, can comprise monomers, oligomers, or polymers, which are soluble or liquid, as a nonvolatile solvent. Polymers may cure due to heat (thermal crosslinking), irradiation (such as UV driven crosslinking), or just solvent evaporation. The system can also include various photo or thermal initiators to promote crosslinking, adhesion promoters, rheology modifiers, reducing agents, and other additives. Metal compound reduction can occur in conjunction with polymer crosslinking or as a result of distinct processing.

The resulting cured material is a solid with metal embedded within a polymer matrix. The composition can be selected for suitable adherence in the contemplated structure. The polymer matrix generally provides desired cohesion with appropriate metal loadings, which can be high, and appropriate processing to achieve suitable uniformity. In some embodiments, other organics distinct from the polymer matrix may also be used for deposition, but then may either remain within the final solid structure, or be removed by subsequent processing. The metal loading can be adjusted to achieve a desired electrical conductivity with tradeoffs possible with the material properties.

As demonstrated herein, the inclusion of significant quantities of reducible metal compositions, such as silver salts and complexes, can be very effective to improve the electrical conductivity of the electrically conductive structures produced. The metal species can be reduced by functional groups in the material to form elemental metal deposits throughout the material. Specifically, solvents, solid organic components, and/or dissolved reducing agents may reduce the metal ions/complexes. Based on nucleation of the metal deposition around metal particulates within the composite, the deposited metal may form robust electrical conduction pathways. Analogous to Applicant's previous work, reduction and deposition of the elemental metal can dramatically improve conductivity by reducing resistances between metallic nano and microstructures.

The solvents for the precursor compositions can be volatile and/or nonvolatile. In particular, the polymer precursors generally are liquids, although potentially viscous, that function as nonvolatile solvents and can be used to disperse the metal particulates, including the silver nanowires, and non-volatile solvents may be polymer precursors. If the reducible metal compound is soluble in the polymer precursors, the precursor compositions may not comprise any volatile solvents. Any volatile solvents should be compatible with the polymer precursors, which implies that the polymer precursors are soluble in the volatile solvent. While volatile solvent may be desirable as a processing aid to adjust viscosity, facilitate blending, allow for thickening from evaporation prior to curing, delay curing of resins until solvent evaporates, or other desired function, the presence of a volatile solvent may be undesirable from an environmental and/or health and/or processing perspective. In some embodiments, a viscous, relatively high boiling point, volatile solvent can be used, such as glycol oligomers and derivatives thereof, so that removal of the volatile solvent substantially takes place during curing. This solvent can be used not only to adjust the rheology and subsequent processing of the ink or paste but can additionally serve as an effective reducing agent to reduce metal ions and complexes. The use of higher boiling temperature solvents, e.g., greater than about 125° C., can allow a solvent to complete reduction of metal compound prior to being completely evaporated. However, while not being limited by theory, the presence of the solid metal particles can decrease the energetic barriers to nucleation and reduction and therefore heterogenous nucleation and reduction of the reducible metal compounds can occur at lower temperatures (less energy) than in isolated, or homogenous systems without solid metal particles. Therefore, even much lower boiling point solvents can reduce the reducible metal compounds, but these solvents, for example ethanol or isopropanol may be too volatile for some practical applications depending on the other precursor composition constituents.

While in some embodiments, the composite electrically conductive materials do not comprise significant quantities of nanowires in the collection of metal particulates, it can be desirable to include silver nanowires to provide improved electrical conduction properties. The nanowires may also improve other characteristics like flexibility and stretchability. The ability to achieve high loadings of silver nanowires in good dispersions provides the basis for the silver nanowire-based composite materials described herein. The blending of other silver particulates allows for desirable control of the properties of the loaded resin materials prior to crosslinking and/or drying. The use of the silver nanowires improved the electrical conductivity. The use of reducible metal compositions can further provide improvement in electrical conductivity due to deposition of metal to augment the initial metal particulates and the likely formation of conduction networks. Existing products, such as electrically conductive adhesives or other metal loaded conductive resins, are generally based on silver micro- or nanoparticles and or silver flakes to form highly conductive electrically conductive adhesive products. This work provides significant advances relative to Applicant's previous work, which has revolutionized several aspects of silver nanowire processing as well as distinct work involving a focus on silver nanoparticles and/or silver flakes. The advances can be viewed as the introduction of quantities of silver nanowires to improve electrically conductive pathways through the composite and/or to deposit silver or other metal through the composite through reduction of metal species, in which these mechanisms can provide significant reduction in electrical resistance.

Much of the work relating to silver nanowires has been directed to transparent conductive films where silver nanowire morphology provides significant advantages for forming these structures. Applicant has developed a proprietary fusing technology to provide for state of the art high quality transparent conductive films with low sheet resistance, high transmittance and very low haze. Sec, for example, U.S. Pat. No. 10,029,916 to Virkar et al., entitled "Metal Nanowire Networks and Transparent Conductive Material," and 10,020,807 to Virkar et al., entitled "Fused Metal Nanostructured Networks, Fusing Solutions With Reducing Agents and Methods for Forming Metal Networks," both of which are incorporated herein by reference. In the context of nontransparent conductive materials, silver nanowires can be loaded into polymers, such as adhesives, to form electrically conductive fillers. See, for example, published U.S. patent application 2024/0290516 to Virkar et al. (hereinafter the '516 application), entitled "Silver Nanowire and Noble-Metal Coated Silver Nanowire Conductive Polymer Composites With Low Loading Percolation Conduction," incorporated herein by reference.

Recently, Applicant has extended this work to provide for room temperature processing of the proprietary fusing process over metal loadings extending from highly transparent to translucent and extending close to opaque. This work is presented in published U.S. patent application 2023/0416552 to Yang et al. (hereinafter the '552 application), entitled "Formation of Electrically Conductive Layers at Room Temperature Using Silver Nanoparticulate Processing and Inks for Forming the Layers," and published U.S. patent application 2024/0257991 to Yang et al., entitled "Formation of Electrically Conductive Layers at Near Ambient Temperature Using Silver Nanoparticulate Processing and Inks for Forming the Layers," both of which are incorporated herein by reference.

In the context of opaque conductive structures formed with silver nanoparticles, the work from Professor Magdassi and coworkers has involved chemical fusing of silver nanoparticles in relatively thick structures, on the order of a micron thickness, to form small, but opaque, conductive traces. This work is described, for example, in published U.S. patent application 2012/0168684 to Magdassi et al, entitled "Process for Sintering Nanoparticles at Low Temperature," incorporated herein by reference. Magdassi found significant dependence on the substrate material with respect to the obtained resistivities. Also, the Magdassi samples were formed without polymer or resin matrix, although a polymer dispersant is referenced without sufficient detail to put this aspect of the Magdassi work in context. The lack of a polymer matrix implies that the process features are expected to be different, and the fusing mechanism used by Magdassi does not seem to be consistent with the use of a significantly polymer matrix.

The use of silver nanoflakes for forming conductive pastes has been described for low temperature processing. These results are described in U.S. Pat. No. 11,084,950 to Graddy, Jr., et al., entitled "Fast Conductivity Polymer Silver," incorporated herein by reference. The '950 patent described material with a resin. The exemplified conductive material in the '950 patent has 82.5 wt % of silver flakes. The '950 patent reports values of resistance for samples with a 1 $cm^3$ volume, but do not seem to provide resistivity values or sufficient information to allow for extraction of resistivity values. The material of the '950 patent can be considered essentially control materials relative to the materials described herein with silver nanowire components and/or with metal salts.

Electrically conductive pastes with silver flakes have been described with the capability of achieving low resistivities. See, for example, published U.S. patent application 2015/0262728 to Ogiwara et al., entitled "Electrically Conductive Paste Composition and Method of Forming an Electrical Circuit on a Polymer Substrate," incorporated herein by reference. This reference teaches 87 wt % to 95 wt % silver flakes and processing at a temperature of 120° C. for a half an hour. These materials have a higher silver loading than the materials in the '950 patent but involve heating to cure the materials.

Previous work involving the loading of silver nanowires into resins involved fairly low loadings of nanowires with the objective of reaching a percolation threshold to achieve some useful electrical conductivity, although significantly greater resistivities relative to the high loading materials described above. Applicant found that the use of noble metal coated silver nanowires were successful in lowering the resistivity at very low loadings in certain composites, so that corresponding improvement could be achieved in the obtainable electrical conductivities. See the '516 application cited above. Nevertheless, the electrical resistivities were significantly larger than described herein.

An example of high loading thermally sintered silver nanowires to form highly conductive materials is found in Zhang et al., "Electrically Conductive Adhesives with Sintered Silver Nanowires," 2009 International Conference on Electronic Packaging Technology & High Density Packaging (ICEPT-HDP) 978-1-4244-4659-9/09 (2009), incorporated herein by reference. The nanowires were not well dispersed before blending the materials to form the composites. Low values of resistivity could be achieved. Another procedure involving the directed blending of silver nanowires into a polymer resin is described in Wang et al., "A Comprehensive Study of Silver Nanowires Filled Electrically Conductive Adhesives," J Mater Sci: Mater Electron, DOI 10.1007/s10854-015-3446-9 (July 2015), incorporated herein by reference. These demonstrative studies perhaps demonstrated achievability of low resistivity loaded polymer composites, but the processing approaches were likely not conducive to commercial processing.

The current advances are built upon Applicant's discovery of techniques to form good dispersions with high loading of nanowires in selected solvents and also on Applicant's earlier work on the improvement in resistivity of transparent conductive materials by reduction of reducible metal compositions. This high loading work is described in copending U.S. patent application Ser. No. 18/634,300 to Virkar et al. (hereinafter the '300 application), entitled "High Loadings of Silver Nanowires: Dispersions and Conductive Pastes; And Corresponding Methods," incorporated herein by reference. The ability to form high concentrations of well dispersed nanowires in selected solvents provides powerful processing flexibility for designs of electrically conductive adhesives, pastes, inks, and electrically conductive loaded polymers generally (collectively referred to as ECA, for convenience). Using well dispersed silver nanowires, uniform blends can be made into inks for depositing the ECA using a desired deposition approach. The '300 application also describes the rheology dependence on the silver nanowire morphology. Especially for transparent conductive films, thin and long nanowires are particularly desirable, but these long and thin nanowires have a morphology that limits loading due to a rapid increase in viscosity as the concentration increases. Thus, the use of shorter and thicker silver nanowires allows for higher loading while maintaining reasonable viscosities.

At high loadings, even shorter and thicker (lower aspect ratio) silver nanowires may result in unprocessable materials at high loadings, which may be still lower concentrations than desired for certain applications. In addition, silver nanowires can have a greater cost than other silver shapes. Nevertheless, large concentrations of silver nanowires can be carried into the processing at a suitable concentration, and solvent can be removed, if needed, at various processing stages. In the present work, silver nanowires are combined with other silver particulates suitable for forming ECA in particular silver particles and/or silver flakes, although components with other metals can be used also. The nanowires can be included in amounts of the metal, such as silver, from about 1 wt % to about 95 wt % relative to total metal. The metal as a portion of total cured solids generally can be from about 45% to about 98%. In additional embodiments, all of the metal particulates can be nanowires, i.e., 100%, although due to contaminants of other metal shapes, this embodiment effectively covers from 95 wt % to 100 wt % nanowires as a fraction of the metal particulates in the precursor composition. A person of ordinary skill in the art will recognize that additional ranges within these explicit ratios are contemplated and are within the present disclosure. With respect to the other metal particulates, the relative amounts, shapes and sizes can be selected to provide desired properties and cost.

The highly loaded ECA can be cured into materials having low values of resistivity. It has been found that the inclusion of the silver nanowires lowers the resistivity relative to comparable ECA without the silver nanowires. While the specific resistivity value reported in the art seem dependent on the specific polymer matrix, substrate, processing and perhaps other parameters, the direct comparison of comparable systems provides confidence of the beneficial effects of including the silver nanowires.

Applicant has developed proprietary fusing technology for improving the conductivity properties of transparent conductive films without degrading the optical properties. Patents related to the fusing technology are referenced above. For embodiments of particular interest, the fusing technology is based on the inclusion of reducible metal compounds (such as silver compositions) that can be reduced to form a fused metal nanostructured network that yields a highly desirable structure for transparent electrically conductive films with reduced or eliminated junction resistance while remaining highly flexible and stable. This fusing process for transparent conductive films has been understood as a thermodynamically driven ripening and/or reduction process with silver deposition directed to junctions to lower the total free energy. As described herein, reducible silver compositions can also facilitate the enhancement of electrical conductivity in the context of high metal loading, low resistivity materials. Similarly, while not being limited by theory, one would expect reduction of the silver compositions at concavities, and areas of low chemical potential between nano and microstructures since these locations would be thermodynamically favorable. The additional reduced metals serve to better connect nano and microstructure like nanowires, flakes, and micro and nanoparticles, thus engendering better electrical connectivity throughout the structure and a lower overall resistivity for an overall metal content. The ability to lower metal content for a target resistivity provides for improved range of achievable material properties.

In the present context, it has been found that the inclusion and reduction of reducible metal composition, especially silver compositions, can lower the electrical resistivity without significantly impacting the material processability. Even with the use of high metal loadings in the compositions, the additional filling in with in situ reduced metal can be significantly beneficial. Current observations suggest that the reduction of electrical resistance may pass through a maximum value as the amount of reducible silver composition increases, but, in addition to the final curing and processing, this may also be a strong function of the overall composition, including the selection and ratio of fillers, and the chemistry of the reducible metal composition. The beneficial effects of the reduced metal compositions can be observed whether or not silver nanowires are present, and silver nanowires can be the only metal particulate while still benefiting from the use of the reducible metal composition.

With high loading dispersions of silver nanowires, amazing properties are observed. See '300 application cited above. First, there is a very strong rheology dependence on the silver nanowire shape and size. Thinner and long silver nanowires can take a paste like, non-Newtonian behavior at relatively low weight percent concentrations, yet the materials form a uniform material that is not observed to separate even though the volume percent solids can be surprisingly low. The use of shorter and thicker nanowires provides for forming materials with higher silver nanowire concentrations. In this previous work described in the '300 application, the amounts of organic polymeric dispersants can be less than about 20 wt % with respect to the nanowire weight and can be significantly lower. Polyvinyl pyrrolidone (PVP) is generally used during nanowire synthesis, and further processing of the nanowires generally brings PVP, or related polymer, such as a copolymer, into the subsequent processing. PVP bound to the nanowires can provide dispersive capabilities, and excess PVP may copurify with the nanowires. Excess PVP, which is not bound to the nanowire surface, can be removed with additional purification effort. In the present context for forming composites, the polymer dispersant, such as PVP, for the silver nanowires can function as a dissolved binder that forms a solid upon removal of the solvent. Thus, the polymer dispersant for the nanowires can be the only or a major organic component of the product conductive composite composition.

Silver nanowires are generally single crystal structures with very high electrical conductivity along the nanowires, and high metal loadings and/or use of NanoGlue™ have been used to reduce junction resistance. The present work extends the work using nanowires for composite materials with lower loadings of silver nanowires with other silver structures with other shapes replacing significant portions of silver nanowires and/or supplementing the silver nanowires to achieve a high metal loading level. Other suitable metal particle shapes include, for example, silver particles (roughly spherical), silver flakes, other small particulate shapes or mixtures thereof. The relative proportion of silver nanowires versus other metal particulates can be selected based on performance considerations for the cured material, cost, processing considerations, properties of the ECA precursor inks or other considerations.

Compositions-Precursors and Cured Electrically Conductive Materials

With respect to the compositions, the precursor compositions and the electrically conductive product materials can be considered. To the extent that there are no volatile solvents, the overall weights of the metal and organic constituents may not change significantly. During curing, any reducible metal compositions can be reduced to elemental metal and the polymer precursors (monomers, oligomers, dissolved polymer binders, i.e. resin system) may crosslink into a unitary material, also solvent removal can solidify previously dissolved binder polymers from the precursor compositions. While a crosslinking process may produce small volatile by-product compounds, the effects of this generally is inconsequential with respect to making any significant changes in relative metal to organic ratios. In relevant embodiments, the crosslinked polymer, physical or chemically crosslinked, may be considered a single unitary mass, which is cohesive. When significant amounts of reducible metal compositions are present, the loaded metal following reduction during curing may form a unitary mass intertwined with the crosslinked polymer as a cohesive composite structure. As a result of these processes, the significant difference between the precursor materials and the cured material can be that the individual constituents of the precursor composition lose their individual identities to varying degrees. It can be difficult to fully evaluate this, although crosslinking density of polymers or binder polymer entanglement, as appropriate, is generally understood, although with high metal loadings, details may be altered. In some embodiments, non-crosslinked organics can also be removed by further processing, such as dissolving the organic material after reducing the reducible metal composition. Generally, all or most of organic contributions can be removed, for example, using higher temperatures or ablation.

The precursor composition generally comprises metal components and organic components. As described herein, the total metal mass, such as silver particulates, in the precursor composition can be from an upper value of no more than about 98 wt %, in further embodiment no more than 95 wt %, in some embodiment no more than about 92 wt %, in additional embodiments no more than about 90 wt % and in some embodiments, no more than about 85 wt %, to a lower value of in some embodiments at least about 50 wt %, in further embodiments about 55 wt %, in additional embodiment about 57.5 wt %, in other embodiments about 60 wt % and in some embodiments about 65 wt % if the total metal mass as a fraction of the precursor composition. Thus, ranges are described based on any of these upper or lower values, such as from about 55 wt % to about 98 wt %. The total metal mass can comprise metal particulates and optionally reducible metal ions provided as a reducible metal composition. Ranges of reducible metal compositions is provided below. In some embodiments, the metal particulates comprise from about 1 wt % to about 95 wt % silver nanowires as a fraction of the metal particulates, in further embodiments from about 5 wt % to about 90 wt %, in some embodiments from about 10 wt % to about 90 wt % and in other embodiments from about 20 wt % to about 85 wt %, and in additional embodiments, all of the metal particulates can be silver nanowires (95 wt %-100 wt %), as well as other ranges based on any selected lower range value with any selected upper range value of these ranges. In additional embodiments, the composites are formed from mainly non-nanowire particulates with the silver nanowires supplementing the material and contributing further to the electrical conduction. For these embodiments, the metal particulates can comprise from about 1 wt % to about 45 wt % silver nanowires, in further embodiments from about 2 wt % to about 40 wt %, in some embodiments from about 3.5 wt % to about 35 wt %, and in additional about 5 wt % to about 30 wt % silver nanowires. Contributions from reducible silver salts is given below. A person of ordinary skill in the art will recognize that additional ranges of total metal mass and of silver nanowire fraction of metal particulates within the explicit ranges above are contemplated and are within the present disclosure.

The precursors compositions overall generally comprise about 2 wt % to about 80 wt % organic components, including any volatile solvents as well as polymer matrix precursors, such as monomers, oligomers, dissolved binder polymers and/or crosslinkable resin. In some embodiments, the precursor compositions can comprise from a lower value of about 2 wt %, in further embodiments from about 5 wt %, in additional embodiments from about 7 wt %, in some embodiments from about 8.5 wt %, in other embodiments from about 10 wt %, and in further embodiments from about 15 wt %, any lower value in a range to an upper value of about 80 wt %, in further embodiments to about 70 wt %, in additional embodiments to about 60 wt %, and in some embodiments to about 50 wt %, with resulting ranges extending from any specified lower value to any specified upper value. The organic components of the precursor compositions can be considered to comprise of non-volatile and volatile components. Some polymer components may be volatile until they polymerize or crosslink, but these components can be considered non-volatile if they are sufficiently high temperature boiling to convert to a non-volatile polymer composition under process conditions before they can significantly volatilize. During curing, the volatile components are generally expected to evaporate, although some amounts may remain bound in the material. While the precursor compositions may have little volatile solvent, such as residual solvent from processing, it can be desirable in some embodiments to maintain additional volatile solvent in the precursor compositions as a process aid. Generally, the polymer precursors can act as a non-volatile solvent. Thus, in some embodiments, the precursor compositions can comprise no more than about 40 wt % volatile solvent, in some embodiments from about 1 wt % to about 35 wt %, in further embodiments form about 3 wt % to about 30 wt %, and in additional embodiments from about 5 wt % to about 25 wt % volatile solvent, as well as any ranges involving any of these upper values with any one of the lower values. Correspondingly, the precursor compositions can comprise from about 2 wt % to about 55 wt % non-volatile organic components, in further embodiments from about 4 wt % to about 50 wt %, in some embodiments from about 5 wt % to about 45 wt % and in additional embodiments from about 7 wt % to about 40 wt % non-volatile organic components, as well as ranges involving combining any upper value with any lower values of these ranges. The precursor compositions can generally comprise up to about 10 wt % (optional) process aids, and in some embodiment from about 0.05 wt % to about 8 wt % and in further embodiments form about 0.1 wt % to about 5 wt %, such as crosslinking agents, viscosity modifiers, plasticizers, hardeners (copolymer constituents), surfactants, or the like. The remainder of the precursor compositions generally comprises metallic components. The metallic components can comprise silver nanowires, other metal particulates and optionally reducible metal compositions. Especially for embodiments with reducible metal salts, the solvent, precursor resins or a resulting polymer matrix generally have hydroxyl groups or other functional groups suitable to reduce the metal species. Furthermore, reducing agents can also be added intentionally to reduce the reducible metal compositions. Suitable reducing agents can include, for example, ammonium or other salts of oxidizable anions, such as sulfite, hydrosulfite, thiosulfate, phosphite, hydrogenphosphite, oxalate, tartrate, or the like, formic acid, N,N-dimethylformamide, alcohols, phenolic compounds, such as phenol, aminophenol, metol, hydroquinone, pyrogallol, catechol, 4-amino-3-hydroxy-1-naphthalenesulfonic acid, and the like; polyols including sugar alcohols; sugars, such as mono-saccharides and disaccharides; hydroxylamine and derivatives; aldehydes; hydroxy carbonyl compounds such as hydroxyketones like benzoin, furoin, hydroxyacetone; hydrazide derivatives such as phthalhydrazide, adipic acid dihydrazide, phenidone, and the like; reduced aromatic compounds such as 1-methyl-1,4-cyclohexadiene, dihydrodiazine, and the like; and combinations thereof. The amount of reducing agent can be selected based on the molar amount of metal salt to be reduced based on equal equivalents.

With respect to the relative amounts of materials in the cured composition, the total weight is altered by the loss of any volatile components, and the relative amounts can then be calculated accounting for any combinations resulting from the curing process, as described above, such as total metal amounts, total organic amounts, as well as any separately identifiable constituents. A person of ordinary skill in the art will recognize that additional ranges of organic concentrations within the explicit ranges above are contemplated and are within the present disclosure.

The total non-volatile organic content of the product conductive solid material, which is after volatile removal and curing, generally is no more than about 55 wt %, including the products from the polymer precursors, and any surviving process aids. In general, the product conductive solid material can comprise from about 3 wt % to about 50 wt % organics, in some embodiments from about 5 wt % to about 45 wt %, in further embodiments from about 7 wt % to about 40 wt % and in additional embodiments from about 8 wt % to about 35 wt % organic content, as well as ranges based on any lower range value specified with an upper range value specified. While the weight percent values are a minority relative to the metal components, the organic content can be relatively larger in terms of volume percent due to the higher density of the metal components. In general, the ECA composition have a volume percent of organic components of no more than about 85 vol %, in some embodiments from about 10 vol % to about 80 vol %, in further embodiments from about 15 vol % to about 77.5 vol % and in additional embodiments form about 20 vol % to about 75 vol %, as well as ranges based on any lower range value specified with an upper range value specified. Good electrical conductivity can be achieved even with a significant volume fraction of organics. A person of ordinary skill in the art will recognize that additional ranges of organic contributions within the explicit ranges above are contemplated and are within the present disclosure.

To provide desired contributions to the electrical conductivity, generally suitable nanowires can have an average aspect ratio of at least about 10, although in some embodiments it can be desirable to use silver nanowires with an aspect ratio of at least about 50. In further embodiments, the silver nanowires can have aspect ratios from about 20 to about 3000, in some embodiments from about 30 to about 1500, in further embodiments from about 50 to about 1000, and in additional embodiments from about 60 to about 500, or any other range based on any lower limit specified with any upper limit specified. Silver nanowire average diameters generally can range from about 15 nm to about 250 nm, in further embodiments from about 20 nm to about 200 nm, in some embodiments from about 25 nm to about 150 nm, and in additional embodiments from about 30 nm to about 100 nm, as well as ranges based any lower range value with any upper range value. The silver nanowire average lengths can be from about 1 micron to about 1000 microns, in further embodiments from about 2 microns to about 800 microns, in some embodiments from about 3 microns to about 700 microns and in additional embodiments from about 4 microns to about 500 microns, as well as any ranges based on any lower range value specified and any upper range value specified. A person of ordinary skill in the art will recognize that additional ranges of aspect ratios, average diameters or average lengths within the specific ranges above are contemplated and are within the present disclosure. The synthesis of thin high aspect ratio silver nanowires with a high degree of uniformity is described in U.S. Pat. No. 10,714,230 to Hu et al., entitled "Thin and Uniform Silver Nanowires, Methods of Synthesis and Transparent Conductive Films Formed From the Nanowires," incorporated herein by reference. The formation of thicker and shorter (lower aspect ratio) silver nanowires are described in the '300 application. To have particularly robust metal nanowires that are resistance to environmental assault, silver nanowires can be formed with thin coatings of a noble metal. Applicant has developed scalable synthesis approaches, as described in U.S. Pat. No. 9,530,534B2 to Hu et al., entitled "Transparent Conductive Films," incorporated herein by reference. These noble-metal coated silver nanowires have been used similarly to silver nanowires in forming transparent conductive coatings. The noble metal coated silver nanowires should perform comparably to silver nanowires for forming high metal loading ECA, as described herein. The noble metal coatings should be relevant for any silver nanowire dimensions, and the noble metal coated silver nanowires are considered silver nanowires herein.

For appropriate embodiments, the other metal particulate, such as silver particulates, other than the silver nanowires, can have any reasonable shapes, although certain particulates are commercially available for use in loaded polymers, adhesives or resins. In particular, metal flakes and particles, roughly spherical, provide convenient availability for commercial scale production at a reasonable cost. Silver nanoparticles with roughly spherical shapes are commercially available in nanoscale sizes, average particle diameters no more than about 200 nm and with average particle diameters, as small as roughly 10 nm to as large as 200-300 nm. Micron sized roughly spherical particles are also available commercially, with average particle diameters from about 1 micron to about 100 microns. A reasonable balance between performance and cost may be achievable with average particle diameters from about 100 nm to about 10 microns. Suitable suppliers of silver particles (micron-sized particles or nanoparticles) include, for example, Heracus, Inframat Advanced Materials, Ames Goldsmith, Sigma Aldrich, SS Nano, Cerion Nanomaterials, SkySpring Nanomaterials, and Nanocomposix. Silver flakes can have a micron-scale lengths (or equivalent diameters) with a small thickness, such as average diameters from about 1 micron to about 20 microns and average thicknesses from about 100 nm to about 2 microns. A representative description of the synthesis of silver nanoflakes, see for example published U.S. patent application 2016/0114390 to Hori et al., entitled "Flake-Like Silver Powder, Conductive Paste, and Method for Producing Flake-Like Silver Powder," incorporated herein by reference. Silver flakes are available commercially, for example, from Tanaka, Ferro, Reade, and Inframat Advanced Materials. In principle, any reasonable conductive particulates can be used, as well as blends thereof, such as silver coated particles, copper particulates, nickel particulates, and the like.

In general, the relative amounts of silver flakes versus silver nanoparticles or other silver particulate shapes can be selected as desired from 1 wt % of each to 99 wt % of each and any range within this range. The selection can be based on cost, precursor composition properties and deliverability, target cured material properties, and/or other selected parameters. For example, thinner deposits may favor silver nanoparticles over silver flakes. The relative amounts of silver nanowires relative to other silver particulate shapes can be similarly influenced. As noted above, some embodiments may not have any silver nanowires. But in embodiments of particular interest, the precursors comprise silver nanowires. Above, ranges are given for total metal components in the precursor compositions, ranges of silver nanowires as a fraction of the total metal amounts and ranges of reducible metal ion contributions relative to total metal amounts are presented below. For any values in these ranges, the non-nanowire silver particulates comprise the rest of the metal component, and the values and ranges of non-nanowire silver particulates as a fraction of the total metal and the total precursor composition follow accordingly.

With respect to relevant embodiments, any soluble, reducible metal composition, such as soluble silver compositions, in principle can be blended into the ECA. Applicant has found that silver fluoride can be particularly subject to reduction in composite systems. This has been useful in the formation of transparent conductive films, which can be processed at room temperature. See, the '552 application, cited above. In these systems with high metal loading and low solvent content, silver fluoride can react too fast, although potentially process modifications can be adapted if desired, to stabilize these metal compositions in the precursor compositions. Furthermore, it's possible to alter the reactivity of silver fluoride with the selection of other chemicals and complexes. Exemplified reducible metal compositions herein are silver acetate, silver trifluoroacetate, and silver heptafluorobutyrate. Suitable reducible silver compositions include, for example, silver acetate (Ag $(O_2CCH_3)$), silver trifluoroacetate $(Ag(O_2CCF_3))$, silver heptafluorobutyrate $(Ag(O_2CC_3F_7))$, silver lactate (Ag $(O_2CCH(OH)CH_3)$), silver hexafluoroantimonate $(AgSbF_6)$, silver fluoride (AgF), silver tetrafluoroborate $(AgBF_4)$, silver nitrate $(AgNO_3)$, silver perchlorate $(AgClO_4)$, silver hexafluorophosphate $(AgPF_6)$, or mixtures thereof, which are generally soluble in solvents of interest. Process conditions can be influenced by the specific silver salt selection. While silver provides highly conductive deposits through the materials, other soluble compositions, such as copper compositions, platinum compositions, gold compositions and other metals, can be used as desired. The desirable effects of soluble silver compositions can even be useful for ECA that do not have any nanowires.

As noted above, the silver ions can be considered a portion of the metal component of the composite. The associated anions can form volatile or non-volatile components during curing and correspondingly may evaporate or not. In general, the precursor composition can comprise silver salts or other reducible metal salts, wherein the weight ratio of the metal/silver from the reducible metal ions to the silver particulates, such as silver nanowires. is generally no more than about 50 wt % of the silver nanowires, in some embodiments from about 0.5 wt % to about 40 wt %, in further embodiments from about 0.75 wt % to about 30 wt % and in other embodiments from about 1.0 wt % to about 25 wt % relative to the total metal weight. The weight of the full salt depends on the weight of the anion relative to the metal cation. Similarly, the weight percent of the metal ions relative to either the full precursor composition or the cured material follows directly from the fraction of the total metal and reduced metal ions for the composition or material and can be correspondingly readily evaluated. The metal salts should be soluble in the solvent or in the precursor mixture, and the silver or other metal salt concentrations can be relatively high for large silver nanowire loadings. A person of ordinary skill in the art will recognize that additional ranges of component concentrations and relative weights within the explicit ranges above are contemplated and are within the present disclosure. As seen in the examples a significant drop in resistivity have been obtained using soluble metal compositions combined with commercial metal pastes. Therefore, the use of reducible metal compositions can be a significant advance even independent of the inclusion of silver nanowires.

The precursors for the final composite polymers, which may be referred to as resins, monomers, oligomers, adhesives, adhesive resins, polymer binders or other appropriate terminology, may crosslink or polymerize during the processing, generally at curing. In some embodiments, the precursors are basically dissolved binder polymers that physically crosslink into solids following solvent removal. With respect to relevant embodiments, crosslinking mechanisms are not generally limited. For example, crosslinking can be radiation driven, such as with ultraviolet light, thermally driven with appropriate heating, spontaneously crosslinking upon solvent removal, chemically, upon exposure to moisture, or any other reasonable mechanism. As used herein, polymer precursor refers broadly to a resin, adhesive, or the like prior to curing such that the polymer precursor is flowable and processable, potentially viscous, although the terms resin or adhesive may take specific meanings in narrow fields of use. Silver nanowire synthesis generally results in polyvinylpyrrolidone (PVP) being carried forward with the silver nanowires. While the PVP amounts can be reduced with further purification, conventional purification can result in about 1 wt % to about 25 wt % PVP relative to weight of the silver nanowires, and the PVP carried forward with the silver nanowires can be considered a component of the overall organic components. Unless indicated otherwise, references to polymer components are naturally interpreted broadly. A large variety of commercial adhesives, resins or other curable polymer precursors are suitable, and can be effective as adhesives, which are broadly defined as polymers suitable to adhere two surfaces to each other. In general, suitable resins include, for example, acrylates, epoxies, silicones, such as poly dimethylsiloxane (which are considered organics even though they have an inorganic backbone), urethanes, polyvinyl acetals, polyvinyl acrylates, copolymers thereof, mixtures thereof and the like. Generally, many crosslinkable resins comprise functional groups that can reduce the metal ions, or the crosslinking of the polymers forms a suitable functional group. Non-crosslinkable polymers can functions as a binder in which processing involves dissolving the binder polymer with subsequent removal of the solvent to solidify the polymer. Due to the high loading of metal in the composite material, the reducing agent may or may not direct all or the major fraction of reduction to specific low energy locations of the metal structure in order to achieve observed improvements in electrical conductivity. Nevertheless, nucleation for deposition can occur in the vicinity of the metal particulates and contribute to an electrically conductive mass.

In contrast to solid organic compositions referenced above, as used herein, "solvent" refers to a liquid composition at room temperature. The process for dispersing silver nanowires can comprise starting with an initial dispersion in a low boiling solvent and then transitioning into a higher boiling solvent if desired, although the dispersion can be maintained in the low boiling solvent. This suggests that solvent transfer is to a higher boiling solvent, but this relationship may not be particularly limiting for the transfer solvent since the initial solvent may be processed under cold or enhanced pressure conditions. For the initial solvent, the solvent should be suitable for forming a dilute stable silver nanowire dispersion and water and low molecular weight alcohols are particularly suitable for forming low concentration good dispersions. If there is a good solvent transfer involved in forming the more concentrated dispersions, the transfer solvent generally should be highly soluble or miscible in an initial dispersion solvent and a solvent in which PVP is soluble to avoid PVP phase separation. Suitable volatile solvents for the dispersions include, for example, water, alcohols, glycols, amides, glycol ethers, sufficiently polar aprotic solvents, such as dimethylsulfoxide, some additional polar solvents and mixtures thereof. Specific volatile solvents include, for example, water, methanol, ethanol, isopropanol, cyclohexanol, ethylene glycol, propylene glycol, dimethylsulfoxide, ethyl lactate, triethylene glycol, butyl cellosolve, butyl carbitol, dimethyl acetamide, dimethyl formamide, acetonitrile, and mixtures thereof. In some embodiments, it can be desirable to use a nonvolatile solvent, as noted above. Generally, solvents comprise the portion of the precursors compositions remaining besides the metal components, metal salt anions, polymer components, unless some or all of the solvent is a polymer component, and any additives.

While solvents refer to liquid compositions, the solvents can be direct precursors for potential further processing. For example, the solvents can be monomers, or oligomers, or polymers that can polymerize and/or crosslink upon further processing, such a heating, irradiation, blending with additional reactants, drying, oxidizing, combinations thereof, or other suitable approach. Suitable monomers or oligomers include, for example, acrylic type such as hydroxyethyl methacrylate, hydroxyethyl acrylamide, diol or polyol type that is precursor of polyurethane such as tetraethylene glycol, 1,3-propylenediol, epoxy type precursors, such as DGEBA (Bisphenol A diglycidyl ether), Celloxide 2021P (Daicel U.S.A., Inc.) or YX8000D (Mitsubishi Chemical Group), radiation curable liquid adhesives, such as optical adhesive NOA 85 (Norland Products, Inc.), and combinations thereof, which may be cured through various thermal, radiation or chemical means. These polymer precursor solvents may or may not be volatile. These polymer precursor solvents can be blended with volatile solvents referred to in the previous paragraph, which generally would be inert under relevant process conditions.

In some embodiments, the precursor compositions can further comprise additives, such as process aids. In general, other processing aids may or may not be used in various precursor compositions, such as surfactants, thickeners, antioxidants, etc. Generally, optional additives would be no more than about 5 wt % and in some embodiments from about 0.01 wt % to about 2 wt % of the non-volatile components. Additives can be selected by composition or amount to not interfere significantly with electrical conduction.

As noted above, curing refers to the process of converting the precursor compositions into a composite material that is solid and electrically conductive. The precursor composition is flowable in the sense of being depositable, while the cured material is a solid and does not flow. As noted above, curing can comprise solvent removal, generally through evaporation, polymerization, crosslinking reductions of metal compositions, combinations thereof, or any other process that contributes to transition of the precursors to a solid material.

The properties of the cured material generally depends significantly on the amount and composition of the polymer matrix. For example, the elastic modulus of the cured composite can be fairly strongly influenced on these parameters. The composition is generally determined by the precursor compositions, although the precise curing process may influence somewhat the final composition. The total metal in particular carries over from the precursors, although reduction of metal compositions during curing can render the internal morphology altered relative to the initial particulate nature. In any case, the metal generally is essentially uniformly distributed through the composite. The relative amount of metal in the cured composite depends on the total organic component in the cured composite. The total organic contribution to the composite generally comprises the non-volatile components of the precursor minus any volatile product compositions resulting from the polymerization or crosslinking reactions. From a quantification perspective, a quantity of the composite can be heated to a sufficiently high temperature to thermally remove all of the organic material to leave just the metal, and the weight loss corresponds to the organic contribution. Such an evaluation can be done in a calorimeter or more simply with a scale and an oven.

With respect to the composition of the cured composite material, the total metal mass can be from an upper value of about 98 wt %, in further embodiment from about 95 wt %, in some embodiment from about 92 wt %, in additional embodiments from about 90 wt % and in some embodiments, from about 85 wt %, to a lower value of in some embodiments at least about 45 wt %, in further embodiments to about 50 wt %, in additional embodiment about 55 wt %, in other embodiments to about 60 wt % and in some embodiments to about 65 wt %, with ranges based on any noted upper value to any noted lower value. Depending on processing and the possible presence of reducible metal compositions in the precursors, it may not be possible to identify quantitatively the sources of the metal after curing, although this is clear from the precursor compositions. Generally, reasonable analyses of the composites should be able to qualitatively evaluate sources of the metal used in forming the cured composite material. The organic component of the composite generally comprises the remaining mass of the composite, although some inorganic by-products can remain from the reducible metal compositions and/or additives. Without knowing the precursor composition, it may not be possible to readily quantify any inorganic by-products, and these may be merged into the metal weight, generally being less than about 5 wt % of the metal. Any by-products that are thermally removed with the organics can be considered part of the organic weight and any by-products that are not thermally removed with organics can be considered part of the metal weight. For the cured composite composition the organic component can be from an upper value of about 50 wt %, in further embodiment from about 45 wt %, in some embodiment from about 42.5 wt %, in additional embodiments from about 40 wt % and in some embodiments from about 35 wt %, to a lower value of in some embodiments of about 2 wt %, in further embodiments to about 5 wt %, in additional embodiment to about 8 wt %, in other embodiments to about 10 wt % and in some embodiments to about 15 wt %, with ranges based on any noted upper value to any noted lower value.

Processing of Dispersions and Methods of Formation

Advances in silver nanowire dispersion processing has provided for the formation of previously inconceivable materials exhibiting surprising properties commensurate with the new compositions. For relevant embodiments, due to the presence of nanowires, the processing procedure is influenced by adoption of suitable ways for incorporation of the nanowires into the composite material. To form a good uniform material, the silver nanowires can be well dispersed prior to combining with the other components of the precursor compositions. Applicant has succeeded in dispersing silver nanowires directly into resins as a nonvolatile solvent, see the '300 application cited above. Nevertheless, it can be desirable to disperse the silver nanowires in a high boiling solvent as a stable stock solution, and this approach is exemplified herein. The solvent used for the nanowire dispersion can be selected to be compatible with respect to solubility of the polymer precursor. The polymer precursor may or may not be diluted with a volatile solvent, and both versions are exemplified herein. Unless needed as a specific processing aid, low boiling volatile solvents are not necessarily used. In additional or alternative embodiments, some solvent can be removed by evaporation, generally, with reduced pressure, to remove some or all of the volatile solvent to make the polymer precursor product. The '300 application teaches suitable solvent transfer procedures to provide for forming concentrated silver nanowire dispersions in a wide range of solvents. In summary, the silver nanowires are generally well dispersed in a more dilute dispersion, generally no more than about 10 wt % solids, in a low boiling point solvent, such as ethanol, which is particularly good for forming a good nanowire dispersion. Then, the desired solvent can be blended with the dilute dispersion in a desired amount, and the low boiling solvent is removed using evaporation, with vacuum and/or heat. In the examples, a 40 wt % solution of silver nanowires is formed in a solvent blend of butyl carbitol (diethylene glycol butyl ether) and triethylene glycol, in which the original ethanol solvent is removed by rotovap. If desired and the low boiling solvent is suitable for the polymer resin, the dilute solution can be used directly, in which the low boiling solvent is then removed after blending or during curing.

The incorporation of reducible silver compositions allows for process improvements along with providing the capability of reducing the metal ions to form in situ deposited metal that is found to potentially significantly lower the resistivity of a formed metal composite. The remaining components can similarly be prepared for blending all of the components together, and this processing may depend on the nature of the components. Ultimately, generally a well-mixed composition is formed, and the mixing process may depend on the concentrations and the rheology of the composition. Various commercial mixing equipment can be adapted for this purpose, although with silver nanowires present, any shear should not be excessive and ultrasonication can be avoided in order to avoid fracturing of the nanowires, if that is not desired.

Polymer precursors can be dissolved in a solvent prior to combining the polymer precursors into the precursor solution, although liquid polymer precursors may be combined directly. Ultrasonication, milling and vortexing can be used to facilitate dissolving polymer precursors. The amount of solvent generally depends on the nature of the polymer precursor as well as the solvent, which can be determined by a person of ordinary skill in the art with additional information possibly provided by the supplier. Reducible silver compositions, generally silver salts, can similarly be dissolved prior to combining with other components to form a stock solution. Suitable concentrations again depend on the silver salt and the solvent.

In some embodiments, at one stage of the processing, the resin or a resin with a desired amount of solvent can be prepared and combined with the metal particulates, without the silver nanowires. The combination can then be sonicated and/or mixed with a mechanical mixer to blend the resin and metal particulates. Once the combination is well mixed, the silver nanowire dispersion is added to the combination and the composite precursor material is then mixed and/or sonicated to form the ECA precursor material, which has a paste-like property and is ready for coating. If the reducible metal composition is added, this can be added with the silver nanowires, prior to the silver nanowires, or subsequent to the solvent nanowires for mixing into the composite material. The exemplified processing order generally can be changed at least for some formulations. For example, the resin may be mixed first with the silver nanowires and then with the other particulates, or the silver nanowires may be mixed with the other material particulates and then with the resin. A person of ordinary skill in the art can select an appropriate process order for a particular formulation using the teaching herein.

As noted above, various mechanism can be suitable for crosslinking the polymer of the composite, or to remove a solvent. Reduction of a reducible metal composition can be performed simultaneously with the crosslinking, such as if thermal processing is performed. Curing conditions may be adjusted to account for polymer curing and any metal reduction, which may suggest somewhat different conditions, such as radiation for polymer curing and heat for silver reduction, and order for applying curing conditions or potentially simultaneous application can be selected empirically by a person of ordinary skill in the art, which generally would not be expected to be significant with respect to the product. Reduction of the reducible metal composition can also be tuned based on the chemistry selected and also by the potential inclusion of other reducing agents (which can also be selected based on their reactivities). Thermal curing can be performed by heating to at least about 75° C., and the upper cutoff in temperature may be determined by the polymer thermal stability, but generally the heating is at a temperature of no more than about 400° C. Heating can be performed for 2 minutes to about 6 hours. Due to a potentially wide range of suitable polymer matric materials and solvents, a correspondingly large range of processing conditions can be suitable. The presence of solvent controls the material temperature based on the solvent boiling point until the solvent evaporates, so a thicker deposit may involve a longer cure time to allow for solvent removal. In some embodiments, the cure temperatures can be from about 80° C. to about 300° C., in further embodiment from about 90° C. to about 250° C., in additional embodiments from about 95° C. to about 225° C., and in other embodiments form about 100° C. to about 200° C. Silver reduction in the composite materials described herein generally involves longer cure times than used in thin transparent conductive systems. In some embodiments, the thermal cure times can be from about 3 minutes to about 5 hours, in further embodiments from about 5 minutes to about 4 hours, in additional embodiments from about 7.5 minutes to about 3 hours, and in other embodiments from about 9 minutes to about 2.5 hours. A person of ordinary skill in the art will recognize that additional ranges within the explicit time and temperature ranges above are contemplated and are within the present disclosure. Furthermore, laser processing to remove organics, or even higher temperature >400 C, such as in an oven or the like, may be useful to further increase the conductivity of the conductive element and optionally remove all organics.

In additional or alternative embodiments, curing can be performed with UV radiation when utilizing the appropriate UV-curable resins, and UV irradiation may be effective to reduce the reducible metal compositions, such as in the presence of ammonia. Penetration of UV radiation through a metal loaded material can be an issue since metal is reflective. This constraint may provide a practical constraint on UV curing for thicker composite material deposits in an appropriate amount of time with a reasonable radiation dose. Practical thicknesses for UV curing may depend on the degree of metal loading as well as possible supplementing of the curing with heat. In some cases, additional heat may be applied before, during or after the UV curing to remove solvent or other volatiles and to further improve the final electrical or thermal conductivity of the conductive element. The dose of radiation delivered is expressed as the energy received in a unit area during the illumination time, generally expressed as Joules per centimeter squared ($J/cm^2$). Suitable light sources can be mercury lamps or UV LED lights. Irradiation with UV light also results in heating so that thermal curing can simultaneously take place. Commercial UV curing systems are available for polymer curing from a wide range of suppliers. Pulsed light can be used to provide the desired light, and the intensity of the radiation may further drive metal sintering, removal of volatile components and also curing of the organic components. Infrared pulsed lights may mainly induce curing through resulting thermal effects. Pulsed light systems are available, for example, from Xenon Corporation (MA, USA) with a range of wavelength options.

Depending on the desired composition, the precursor composition can take on a range of properties, such as from a printable ink to a spreadable paste. While the amount of solvent generally provides a versatile adjustable parameter, the compositions can be similarly adjusted to alter the precursor composition properties. The amount of metal can be selected to a significant degree by the target electrical resistivity, the amount of metal may also constrain the practical ranges of precursor properties and corresponding deposition options. Nevertheless, reasonable composition adjustments provide a significant range of precursor properties. While the precursor compositions may have reasonable electrical conductivity itself, generally applications are directed to the cured forms which have appropriate stability for applications.

Prior to curing, the precursor composition can be deposited in a suitable location where the cured composition is intended to provide desirable electrical conductivity. Deposition can comprise blanket coating and patterning, such as using laser ablation, photolithography or other suitable patterning approach, or selective printing, such as screen printing, gravure printing, gravure offset printing, nanoimprint printing, or the like, or jetting delivery to directly form a desired electrically conductive structure. Coating methods can include, for example, slot coating, spray coating, extrusion, or the like. In general, commercial printing or coating equipment can be adapted for delivery of the precursor compositions. More viscous precursors can be delivered with a syringe, extrusion, or the like. The configuration of the deposited material generally is very application dependent. For example, the deposits can be dots to electrically connect adjacent elements, such as a solder ball can be used. In further embodiments, stripes of ECA can be used to electrically connect more distant structures, such as used for replacing metal traces or the like. There is no particular limit on the specific configurations. Curing conditions may be influenced by ancillary materials, which could limit process temperatures, which could be reduced in favor of longer process times, and rheology of the ECA precursors can be adjusted to provide for suitable deposition for the particular application.

Coating/Material Properties

The electrically conductive coatings or deposits generally are opaque materials and can be formed for use as non-transparent structures. Non-transparent, such as translucent or opaque, layers are generally formed with higher metal loading to impart lower sheet resistances. For these coatings, generally haze and other optical properties are not of particular concern and may not be meaningful. These highly conductive structures can be used to form metal traces, bus bars, electromagnetic shields, or the like. Since electrical conductivity generally is a significant characterizing property of the composite materials, the amount of silver nanowires may be adjusted based on cost and target mechanical properties since a higher portion of silver nanowires may allow for a reduced metal loading with an increased mechanical influence form the polymer matrix and an increase in cost, and vice versa if the portion of silver nanowires is reduced.

Electrical resistance of thin coatings can be expressed as a sheet resistance (Rs), which is reported in units of ohms per square (Ω/□ or ohms/sq) to distinguish the values from bulk electrical resistance values according to parameters related to the measurement process. Sheet resistance along a surface can be generally measured using a four point probe measurement or another suitable process. If the thickness of the structure is known or measurable, the resistivity (ρ) can be evaluated as $\rho=R_s t$, where t is the average thickness. the resistance is expressed as $R=\rho L/A$, where ρ is the resistivity, L is the length and A is the area of a conductive element perpendicular to the conduction direction. To the extent that a bus bar placement or similar conductive element configuration provides for decreasing L or increasing A, the resistance can be decreased. The resistivity is an intrinsic parameter that it is independent of size and has units of ohms-length. While the measured sheet resistance depends on the nature and dimensions of the corresponding structure, resistivity is an intrinsic property of a material independent of the structure, assuming that the material is uniform. Bulk silver resistivity is reported as $1.59\times10^{-6}$ Ohm-cm, which is the lower limit for resistivities of a silver based conductor. The highly loaded silver materials can achieve resistivities no more than about $5\times10^{-3}$ Ohm-cm, in some embodiments no more than about $5\times10^{-4}$ Ohm-cm, in further embodiments, no more than about $1\times10^{-4}$ Ohm-cm and in other embodiments from about $5\times10^{-5}$ to about $5\times10^{-6}$ Ohm-cm, as well as any resistivity ranges using any one of the explicit lower range values with any explicit upper range values. In some embodiments, it is found that the reduction of a reducible metal composition, such as a silver salt, can be effective to reduce the observed resistivity by at least about 25%, on further embodiments by at least about 50%, in some embodiments by at least about 75%, and in further embodiments from about 80% to a measurable value from an open circuit value. A person of ordinary skill in the art will recognize that additional ranges of resistivity and changes of resistivity within the explicit ranges above are contemplated and are within the present disclosure.

For testing, the loaded precursor composition, with the properties of a paste was coated onto a glass slide between 60 micron thick spacers. Then, the spacers were removed, and the glass slide with coated paste was cured at a selected temperature for a selected time, such as in a well ventilated oven. For UV cured polymers, the prepared glass slide can be exposed to a UV light source for an appropriate dose according to the polymer specifications. After curing, the dimension of the cured ECA coupon could be measured, such as with a micrometer or the like. Also, the sheet resistance and resistance could be measured. Using the measured dimensions and the measured sheet resistance or resistance, values of resistivity can be calculated.

EXAMPLES

Materials

The following materials were used in Examples 1-10:

Silver Additives

| | |
|---|---|
| AgFL | silver flakes, 5-8 micron (47MR-73R from Inframat Advanced Materials) |
| AgMP | silver microparticles, silver powder of highly uniform spheroidal shape, purity >99%, d50 of 0.35 micron or average particle size from 0.4 micron to 1.0 micron (Inframat Advanced Materials) |
| AgNP | silver nanoparticles (a) or (b):<br>(a) silver powder, <150 nm (Sigma Aldrich)<br>(b) nanopowder 100 nm (SkySpring Nanomaterials) |

Salts

| | |
|---|---|
| AgAc | silver acetate, $Ag(O_2CCH_3)$ |
| AgTFA | silver trifluoroacetate, $Ag(O_2CCF_3)$ Sigma Aldrich |
| AgHFB | silver heptafluorobutyrate, $Ag(O_2CC_3F_7)$ |
| AgLac | silver lactate, $Ag(O_2CCH(OH)CH_3)$ |
| AgHFA | silver hexafluoroantimonate, $AgSbF_6$ |

Monomers, Other Organics

| | |
|---|---|
| G4335 | Genomer ® 4335 from Rahn AG, trifunctional aliphatic urethane acrylate, hydroxy functional, UV curable |
| NOA85 | optical adhesive from Norland Products, Inc., aliphatic urethane acrylate and 2,2,2-trifluoroethyl methacrylate (about 1:1 by weight), UV curable |
| V80300 | Vitralit ® 80300 from Panacol-USA, Inc., modified acrylate |
| PB3600 | Epolead ® PB3600 from Daicel ChemTech, Inc., epoxidized polybutadiene, 193 epoxy equivalent |
| 2021P | Celloxide ® 2021P from Diacel ChemTech, Inc., 3,4-epoxycyclohexylcarboxylate, UV or thermally curable |
| YX8000D | jER ™ YX8000D from Mitsubishi Chemical Corp., hydrogenated Bisphenol A diepoxy, thermally curable |
| 815C | Epon ™ 815C from Miller-Stephenson, Inc., bisphenol A based epoxy resin + n-butyl glycidyl ether |
| EX612 | Denacol ™ EX-612 from Nagase America LLC, sorbitol polyglycidyl ether |
| MHHPA | Hexahydro-4-methylphthalic anhydride |
| HEMA | 2-Hydroxyethyl methacrylate |
| EMI-24 | Imicure ® EMI-24 from Evonik Corp., 2-ethyl-4-methylimidazole, curing agent |

H-Nanowires HNWs

Silver nanowires referred to as H-nanowires (HNW) were synthesized in a closed reactor system wherein a heated reaction solution of ethylene glycol (EG), polyvinylpyrrolidone (PVP K30 from BASF) and $NH_4Cl$ was prepared, followed by addition of $AgNO_3$, with continuous stirring for several hours at a temperature of about 160° C. Following completion of the synthesis, the silver nanowires were purified using acetone precipitation, and re-dispersion in water or other solvents. The purified silver nanowires were removed from dispersion, dried, and characterized by transmission electron microscopy as described, for example, in U.S. Pat. No. 10,714,230 to Hu et al.

H-nanowires were prepared with average diameters of about 60 nm and average lengths of about 5 microns (referred to as H-5). For some examples, H-nanowires with average lengths of less than 5 micron were prepared by sonication of H-5 nanowires to reduce average lengths to about 2 micron and 1 micron, referred to as H-2 and H-1, respectively. The H-5 nanowires were used in the examples unless otherwise specified.

Preparation of HNW Composites

The following procedure was used to prepare a composite of 40 wt % HNW in an epoxy resin.

1. Preparation of HNW Stock Solution

A required amount of HNW in ethanol was taken into a 24/40 ground glass joint Erlenmeyer flask. A solvent mixture of butyl carbitol (BC) and triethylene glycol (TEG), at a weight ratio of 5:1, was added to the flask to give HNW/solvent mixture having a weight ratio of 4:6 for silver to solvent. The HNW/solvent mixture was mixed by hand for about a minute. Ethanol was removed on a rotavapor with the water bath temperature set at 35° C. The resulting HNW dispersion concentrate was further dried under vacuum at about 60 mmHg, for 4-8 hours at 35-40° C. to obtain an ethanol free, 40 wt % HNW dispersion.

2. Preparation of Silver Particulate/Epoxy Resin

An epoxy resin mixture comprising curing agent and hardener was taken into a 20 mL glass vial. The solvent mixture of BC and TEG, at a weight ratio of 5:1, was added to the vial and mixed with the epoxy resin mixture using vortex from 1 to 3 minutes. A required amount of silver flakes (AgFL) and silver microparticles (AgMP) were then added to the vial. Mixing was carried out for 10 minutes using a THINKYMIXER (Thinky USA) operating at 1000 rpm, followed by sonicating for 60 minutes using a BRANSON 8800 Ultrasonic Bath (Branson Ultrasonics Corp.) at 40 KHz.

3. Preparation of Composite and Coating

The HNW stock solution was added to the silver particulate/epoxy resin and the resulting mixture was vortexed for 1 min followed by mixing for 10 minutes with a THINKYMIXER operating at 1000 rpm. The resulting paste was then coated onto a microscopic glass slide using 60 micron tape spacers. Afterwards the coating spacers were removed and the coated paste was cured at 150° C. for 30 minutes in a well-ventilated box oven. The test coupon was then cooled down to room temperature inside a fume hood and checked for curing and uniformity.

The HNW composites used in the examples were similarly prepared as described above. For some examples, curing of the silver was carried out using high-intensity pulsed light (IPL) provided by a system from XENON Corp.

Testing Procedures

Length, width, and actual thicknesses of cured, uniform coatings were measured, the thickness using a micrometer on different areas of the coupon and the average was taken as the thickness. Resistances (R) across the lengths of the coating were measured using a Fluke 1507 multimeter (Fluke Corp.), and for sub-ohm resistance values, using an EXTECH 380460 milliohm meter (Extech Instruments Co.).

Example 1—HNW Only Composites in Urethane-Acrylate Resin

Composites of HNW in different resin systems were prepared and cured by applying UV (18 $J/cm^2$) and then heat at 120° C. for 30 minutes. Resistance of each composite was measured and volume resistivity and sheet resistance for 25 micron calculated. Results are shown in Table 1.

TABLE 1

| Composite | HNW (wt %) | Resin | Resin (wt %) | Resistance (Ohm) | Resistivity (Ohm-cm) | Calculated Rs (Ohms/sq/25 micron) |
|---|---|---|---|---|---|---|
| C-H1 | 80 | NOA85 | 20 | | $2.0 \times 10^{-4}$ | 0.67 |
| C-H2 | 40 | V80330 | 60 | OL | NA | NA |
| C-H3 | 50 | V80330 | 50 | 1600 | 4.2 | 168 |
| C-H4 | 60 | V80330 | 40 | 2.7 | $5.8 \times 10^{-4}$ | 0.23 |
| C-H5 | 70 | V80330 | 30 | 1.85 | $2.9 \times 10^{-4}$ | 0.12 |
| C-H6 | 80 | V80330 | 20 | 1.29 | $3.4 \times 10^{-4}$ | 0.14 |
| C-H7 | 90 | V80330 | 10 | 0.58 | $1.7 \times 10^{-4}$ | 0.07 |

Composites of HNW in PB3600 with EMI-24 crosslinker were prepared and cured by applying heat at 120° C. for 30 minutes followed by 150° C. for 5 minutes. Resistivity of each composite was measured and sheet resistance Rs calculated for 25 micron. Results are shown in Table 2.

TABLE 2

| Composite | Silver (HNW): Resin | Resin | Resistivity (Ohm-cm) | Calculated Rs (Ohms/sq/ 25 micron) |
|---|---|---|---|---|
| C-H8 | 60:40 | PB 3600 + EMI-24 | $4.6 \times 10^{-4}$ | 0.18 |
| C-H9 | 70:30 | PB 3600 + EMI-24 | $2.1 \times 10^{-4}$ | 0.083 |
| C-H10 | 80:20 | PB 3600 + EMI-24 | $2.1 \times 10^{-4}$ | 0.081 |
| C-H11 | 90:10 | PB 3600 + EMI-24 | $3.5 \times 10^{-4}$ | 0.138 |

Example 2—HNW, Silver Particulate and AgTFA in Urethane-Acrylate Composites

Composites of HNW, silver particulates and silver salts were prepared as described in Table 3.

TABLE 3

| Composite | HNW (wt %) | AgFL (wt %) | AgMP (wt %) | AgTFA (wt %) | NOA85 (wt %) | V80300 (wt %) |
|---|---|---|---|---|---|---|
| S-1 | 18.6 | 40.6 | 13.6 | 7.2 | 20 | — |
| S-2 | 17 | 37.3 | 12.4 | 13.2 | 20 | — |
| S-3 | 18.7 | 42.2 | 14.1 | 4.8 | 10 | 10 |

Coatings of the composites were prepared and cured as described in Table 4 where UV cure was carried out at 10 J/cm$^2$, followed by additional heating treatment. Resistance of each coating after various heat treatment was measured and used to calculate resistivity and sheet resistance Rs. Results are shown in Table 4.

TABLE 4

| Composite Coating | Composite | Thickness (micron) | Curing Conditions | Measured Resistance (Ohm) | Calculated Resistivity (Ohm-cm) | Calculated Rs (Ohms/sq/ 25 micron) |
|---|---|---|---|---|---|---|
| 1a | S-1 | 40 | UV + 15 min at 120° C. | 0.07 | $1.7 \times 10^{-5}$ | 0.007 |
| 1b | S-1 | 40 | UV + 15 min at 120° C. | 0.05 | $1.6 \times 10^{-5}$ | 0.006 |
| 2a | S-2 | 40 | UV + 15 min at 250° C. | 0.13 | $1.9 \times 10^{-5}$ | 0.008 |
| 2b | S-2 | 43 | UV + 1 min at 250° C. | 6.65 | $1.9 \times 10^{-3}$ | 0.751 |
| 2c | S-2 | 46 | UV + 5 min at 250° C. | 2.81 | $5.9 \times 10^{-4}$ | 0.234 |
| 2d | S-2 | 43 | UV + 15 min at 250° C. | 0.11 | $3.2 \times 10^{-5}$ | 0.124 |
| 2e | S-2 | 43 | UV + 45 min at 250° C. | 0.092 | $2.6 \times 10^{-5}$ | 0.0104 |
| 3a | S-3 | 55 | UV + 15 min at 250° C. | 0.15 | $5.5 \times 10^{-5}$ | 0.022 |
| 3b | S-3 | 45 | UV + 30 min at 150° C. | 1.54 | $2.8 \times 10^{-4}$ | 0.109 |
| 3c | S-3 | 45 | UV + 1 min at 250° C. | 0.22 | $3.9 \times 10^{-5}$ | 0.016 |
| 3d | S-3 | 45 | UV + 5 min at 250° C. | 0.22 | $3.9 \times 10^{-5}$ | 0.016 |
| 3e | S-3 | 45 | UV + 15 min at 250° C. | 0.21 | $3.8 \times 10^{-5}$ | 0.015 |
| 3f | S-3 | 45 | UV + 45 min at 250° C. | 0.14 | $2.5 \times 10^{-5}$ | 0.009 |

FIG. 1 is a plot of sheet resistance Rs as a function of curing time at 250° C. Sheet resistance decreases significantly up to about 4 minutes and then becomes stable.

Figure 2:
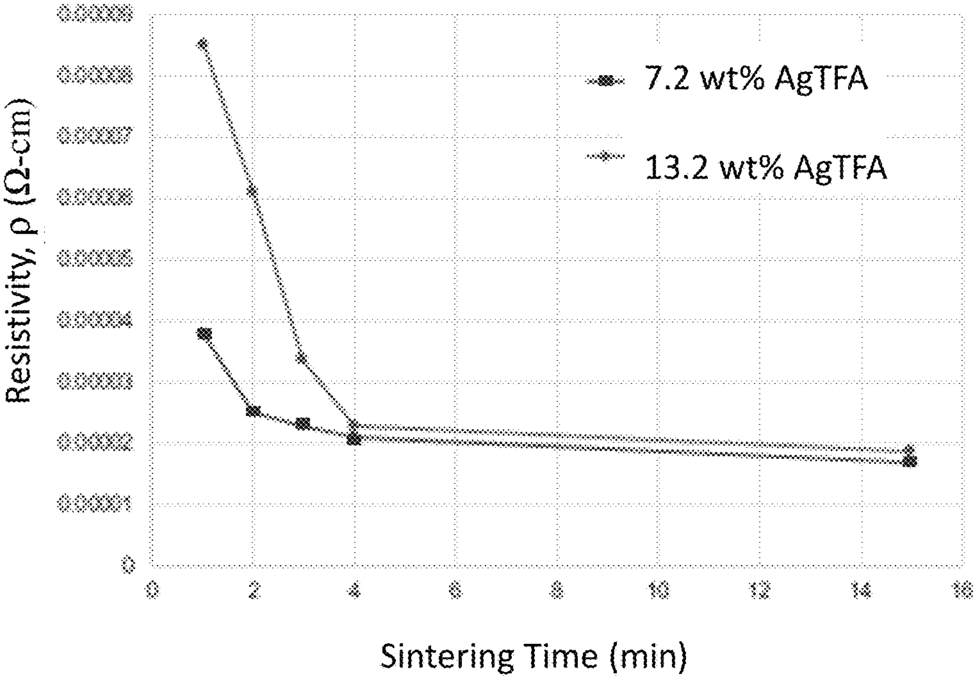
FIG. 2 is a plot of resistivity as a function of sintering time for the composite described for FIG. 1 and for a similar composite comprising about 13 wt % AgTFA.

Composites S-1 and S-2 were coated and cured at 250° C. for selected times ranging from 1 to 15 minutes. Resistivity of each coating was measured and results are shown in Table 5. FIG. 2 is a plot of resistivity as a function of curing time for the coatings. Resistivity of the paste before curing was in the range of $10^{-3}$ Ohm-cm.

TABLE 5

| Curing Time | Resistivity Ohm-cm | | Calculated Rs (Ohms/sq/25 micron) | |
|---|---|---|---|---|
| (min) | (S-1) | (S-2) | (S-1) | (S-2) |
| 1 | $3.8 \times 10^{-5}$ | $8.5 \times 10^{-5}$ | 0.020 | 0.034 |
| 2 | $2.5 \times 10^{-5}$ | $6.1 \times 10^{-5}$ | 0.010 | 0.024 |
| 3 | $2.3 \times 10^{-5}$ | $3.4 \times 10^{-5}$ | 0.009 | 0.013 |
| 4 | $2.1 \times 10^{-5}$ | $2.3 \times 10^{-5}$ | 0.008 | 0.009 |
| 15 | $1.7 \times 10^{-5}$ | $1.9 \times 10^{-5}$ | 0.007 | 0.008 |

Figure 3A:
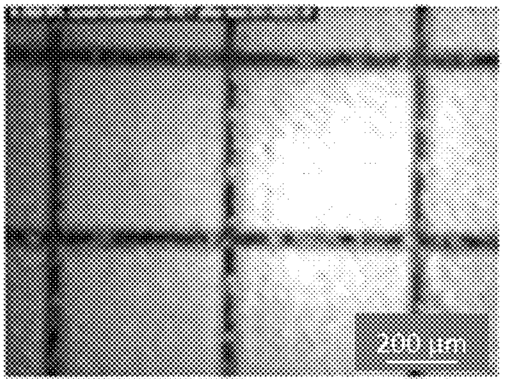
FIGS. 3A and 3B are images at 5× magnification of composites described for FIG. 1 coated and cured on polyester terephthalate (PET), then subjected to a cross-hatch adhesion test.
Figure 4A:
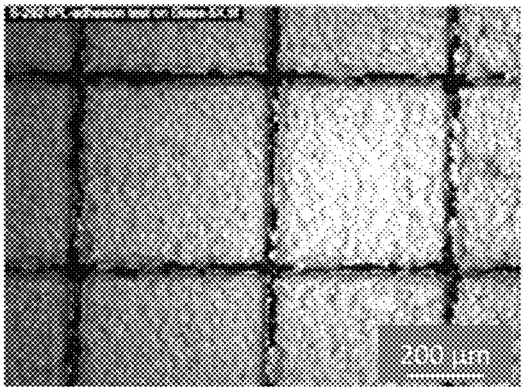
FIGS. 4A and 4B are images at 5× magnification of composites described for FIG. 1 coated and cured on glass, then subjected to a cross-hatch adhesion test.
Figure 3B:
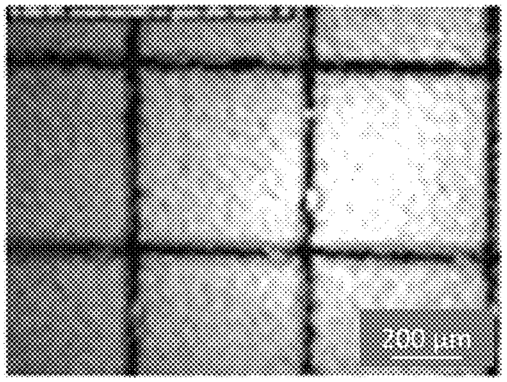
Figure 4B:
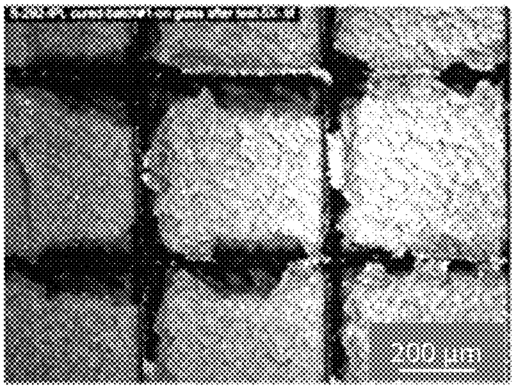
Figure 3C:
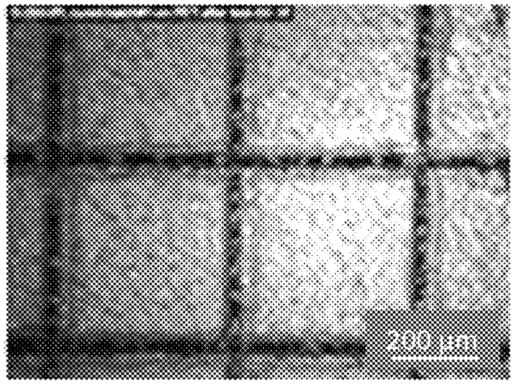
FIG. 3C is an image at 5× magnification of the composite comprising 13 wt % AgTFA as described for FIG. 2 coated and cured on PET, then subjected to a cross-hatch adhesion test.
Figure 4C:
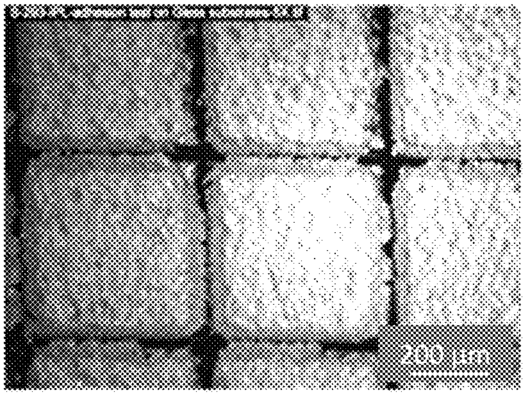
FIG. 4C is an image at 5× magnification of the composite comprising 13 wt % AgTFA as described for FIG. 2 coated and cured on glass, then subjected to a cross-hatch adhesion test.

Coatings of S-1 and S-2 on 125 micron PET and 1 mm glass were prepared and cured using IPL. The coatings were cross-hatched and adhesion visually evaluated. FIGS. 3A-3C show 5× optical microscopic images, respectively, of S-1 (2 samples) and S-2 coated on 125 micron PET. All three samples were rated ASTM Class 5B (ASTM 3359). FIGS. 4A-4C show 5× microscopic images, respectively, of S-1 (2 samples) and S-2 coated on 1 mm glass. All three samples were rated 5B.

Figure 5:
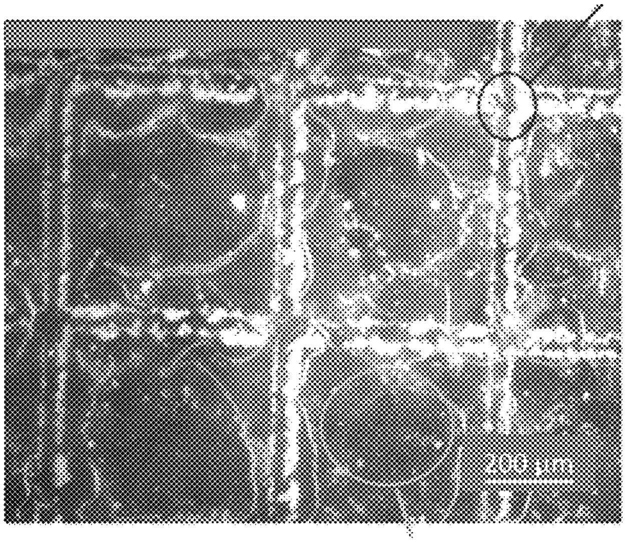
FIG. 5 is an image at 5× magnification showing the adhesive side of tape used in the cross-hatch adhesion test of the composite on PET described for FIG. 3A.
Figure 6:
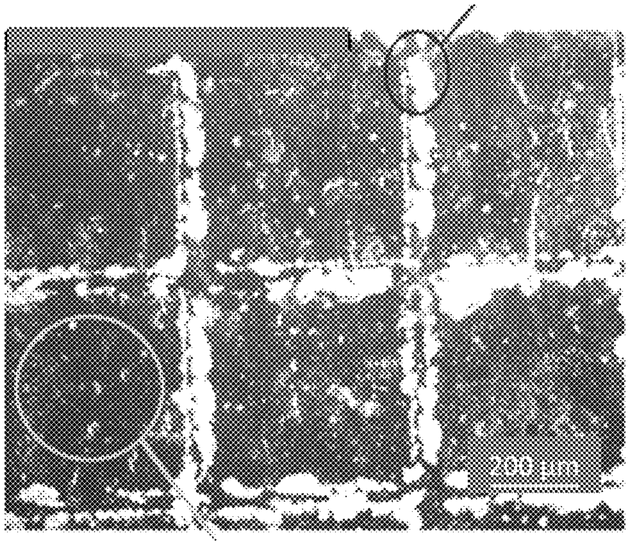
FIG. 6 is an image at 5× magnification showing the adhesive side of tape used in the cross-hatch adhesion test of the composite on glass described for FIG. 4A.

FIGS. 5 and 6 show images of S-1 coated on 125 micron PET and 1 mm glass, respectively, obtained at 5×. In each figure, debris of the composite is visible on the surface where the cut lines intersect and is related to the cutting process. There is no debris on the surface between hatch marks for either coating which suggests good adhesion of the composites to the substrates.

Composites including HNW and varying amounts of silver particulates were prepared as shown in Table 6. Composites were coated on glass slides, UV cured at 10 J/$cm^2$, followed by a treatment of 2 min at 100 C. Resistivity of each coating was measured and results are also included in Table 6.

TABLE 6

| Composite | HNW (wt %) | AgFL (wt %) | AgMP (wt %) | NOA85 (wt %) | Resistivity (Ohm-cm) | Calculated Rs (Ohms/sq/25 micron) |
|---|---|---|---|---|---|---|
| S-4 | 80 | 0 | 0 | 20 | $2.0 \times 10^{-4}$ | 0.079 |
| S-5 | 0 | 60 | 20 | 20 | $2.2 \times 10^{-3}$ | 0.87 |
| S-6 | 20 | 45 | 15 | 20 | $6.3 \times 10^{-4}$ | 0.25 |
| S-7 | 30 | 37.5 | 12.5 | 20 | $5.2 \times 10^{-4}$ | 0.20 |
| S-8 | 36 | 32.7 | 11.3 | 20 | $6.0 \times 10^{-4}$ | 0.24 |
| S-9 | 45.6 | 25.8 | 8.6 | 20 | $5.5 \times 10^{-4}$ | 0.22 |

The effect of the silver flakes alone (without HNW) was evaluated by preparing composites using V80300 as resin as shown in Table 7. Composites S-10 and S-11 were liquid coatable and S-12 was paste coatable. Resistance and resistivity of each coating were measured and are shown in Table 8.

TABLE 7

| Composite | AgFL (wt %) | V80300 (wt %) | Coatability | Curing Conditions |
|---|---|---|---|---|
| S-10 | 40 | 60 | liquid coatable | NA |
| S-11 | 60 | 40 | liquid coatable | UV + 30 min at 120° C. |
| S-12 | 80 | 20 | paste coatable | UV + 30 min at 120° C. |

TABLE 8

| Composite | Resistance (Ohm) | Resistivity (Ohm-cm) | Calculated Rs (Ohms/sq/25 micron) |
|---|---|---|---|
| S-10 | OL | NA | NA |
| S-11 | 150 | $2.4 \times 10^{-2}$ | 9.4 |
| S-12 | 8.5 | $2.8 \times 10^{-3}$ | 1.1 |

OL = Open line

Example 3—Curing With Pulsed Radiation of Urethane-Acrylate Composites

Coatings of composites S-1 were prepared and cured using IPL. Energy per 300 counts was varied between 300 J and 700 J.

TABLE 9

| Composite Coating | Composite | Thickness (micron) | Pulse Energy (J/300 counts) | Measured Resistance (Ohm) | Calculated Resistivity (Ohm-cm) | Calculated Rs (Ohms/sq/25 micron) |
|---|---|---|---|---|---|---|
| 4a | S-1 | 68 | 300 | 4.35 | $4.7 \times 10^{-3}$ | 1.86 |
| 4b | S-1 | 100 | 400 | 0.40 | $6.4 \times 10^{-4}$ | 0.252 |
| 4c | S-1 | 40 | 500 | 0.10 | $6.5 \times 10^{-5}$ | 0.025 |
| 4d | S-1 | 42 | 600 | 0.18 | $1.2 \times 10^{-4}$ | 0.048 |
| 4e | S-1 | 52 | 700 | 0.07 | $5.8 \times 10^{-5}$ | 0.023 |

Figure 7:
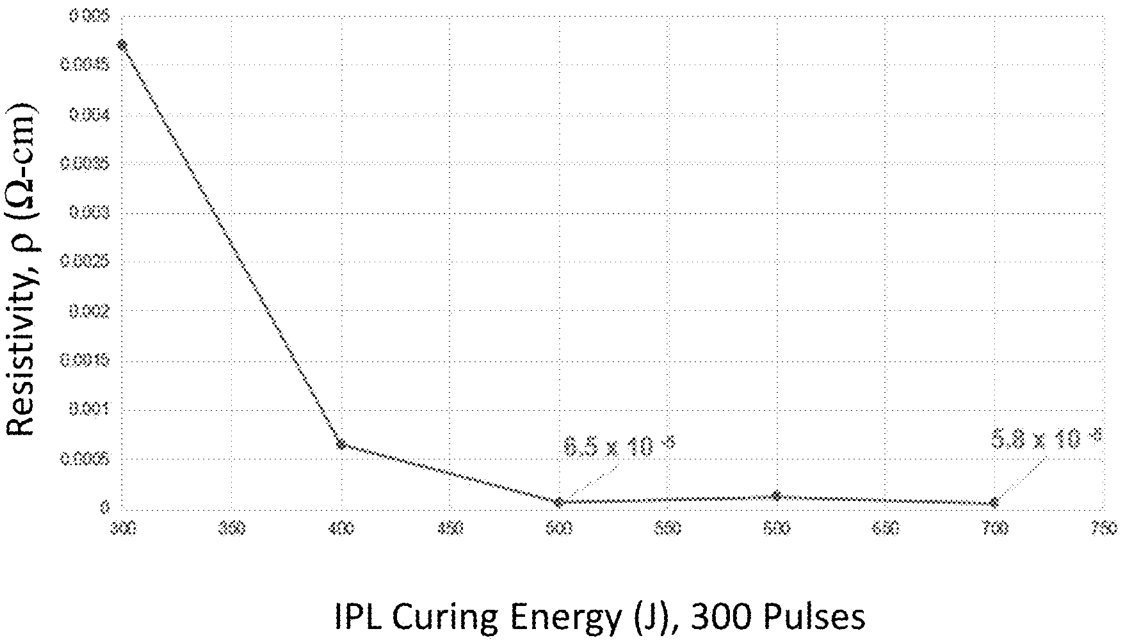
FIG. 7 is a plot of resistivity as a function of curing energy for the composite described for FIG. 1 cured using high-intensity pulsed light (IPL).

FIG. 7 is a plot of resistivity as a function of curing energy for composite S-1. Resistivity decreases significantly when curing energy increases from 300 J to 700 J after 300 pulses.

Figure 8A:
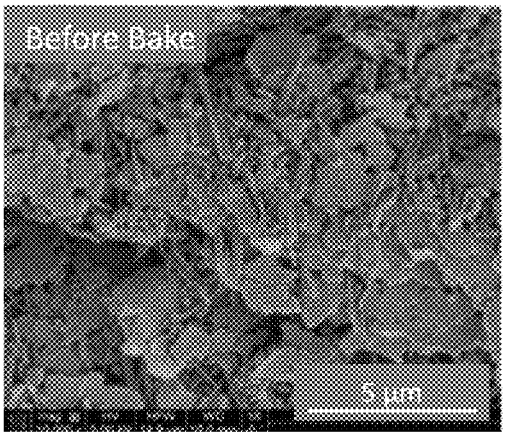
FIG. 8A is an image at 10,000× magnification of a cross-section of the composite described for FIG. 1 before the composite was cured or sintered.
Figure 8B:
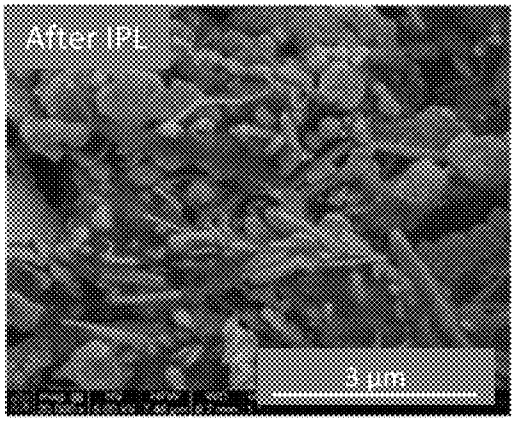
FIG. 8B is an image at 20,000× magnification of a cross-section of the composite described for FIG. 8A after the composite was cured using IPL.
Figure 8C:
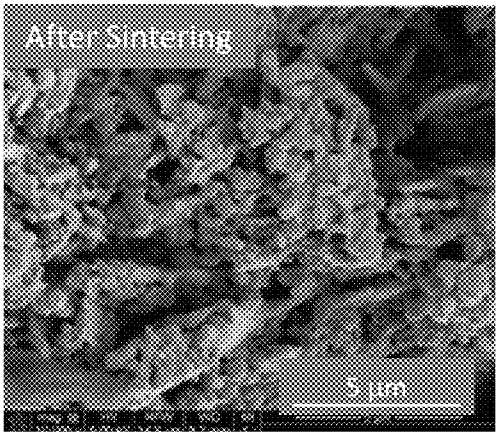
FIG. 8C is an image at 10,000× magnification of a cross-section of the composite described for FIG. 8A after the composite was sintered at 250° C. for 15 minutes.

FIGS. 8A-8C show images of cross-sections of S-1, respectively, before bake at 10,000×, after IPL at 20,000× and after curing at 250° C. for 15 minutes at 10,000×. The HNWs were fully melted for the sample after curing compared to the IPL cured sample in which the morphology of the HNWs was modified and not completely melted because of the local heat process. The before bake sample exhibited a resistivity of $1.8\times10^{-2}$ Ohm-cm. The after IPL sample exhibited $1.2\times10^{-4}$ Ohm-cm. The after curing sample exhibited $1.6\times10^{-5}$ Ohm-cm.

Figure 9A:
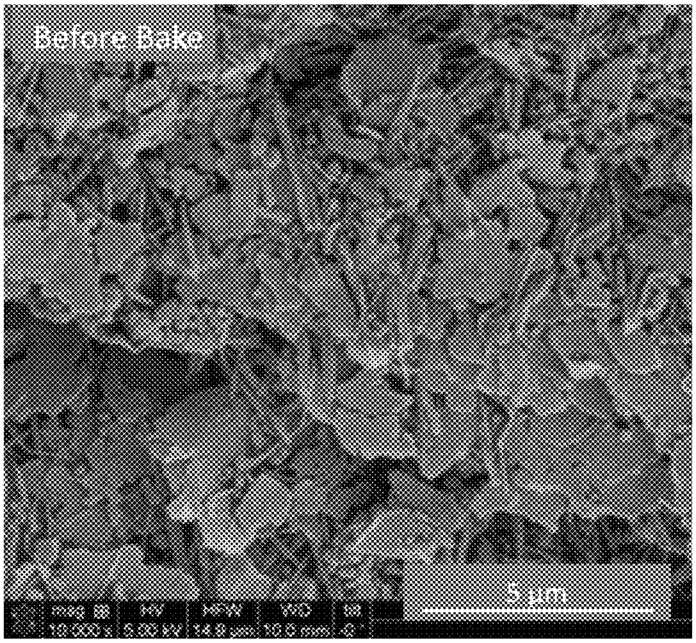
FIGS. 9A and 9B are images at 10,000× and 60,000× magnifications, respectively, of a cross-section of the composite described for FIG. 1 before the composite was cured or sintered.
Figure 9B:
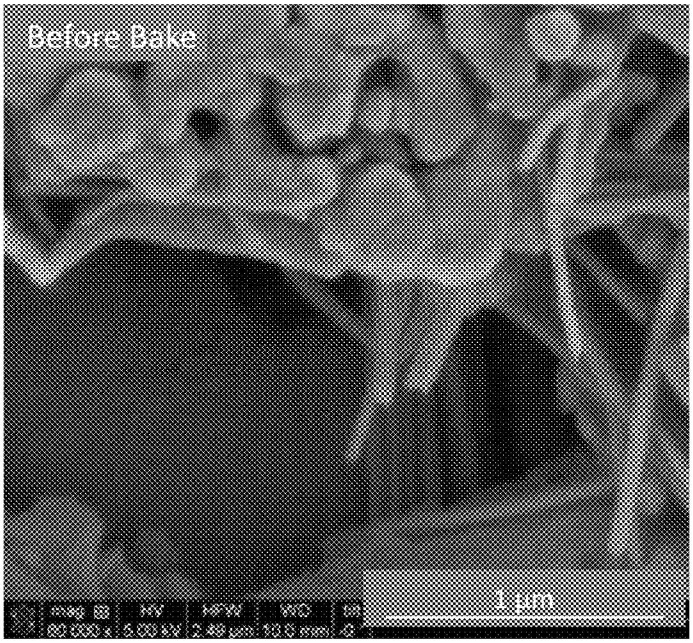

FIGS. 9A-9B show images of cross-sections of S-1 before bake at 10,000× (FIG. 9A) and 60,000× (FIG. 9B). The HNWs are not uniformly dispersed. Conductivity can be improved by improving the dispersion and uniformity of HNW in the bulk composite.

Figure 10A:
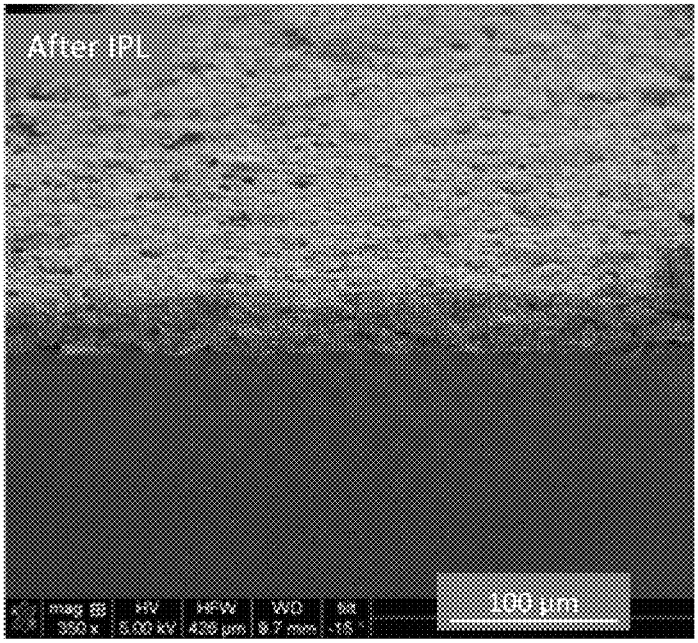
FIGS. 10A and 10B are images at 350× and 20,000× magnifications, respectively, of a cross-section of the composite described for FIG. 8A after the composite was cured using IPL.
Figure 10B:
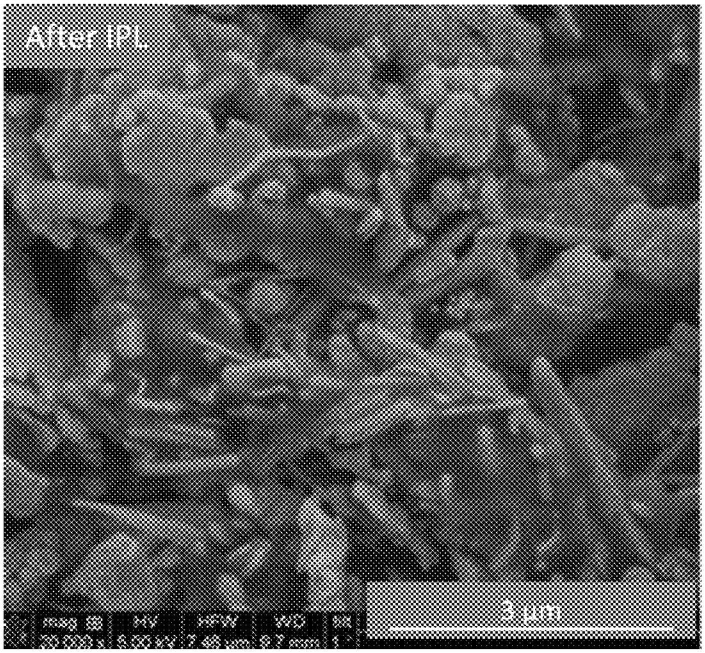

FIGS. 10A-10B show images of cross-sections of S-1 after IPL (600 J/300 ct) at 350× (FIG. 10A) and 20,000× (FIG. 10B).

Figure 11A:
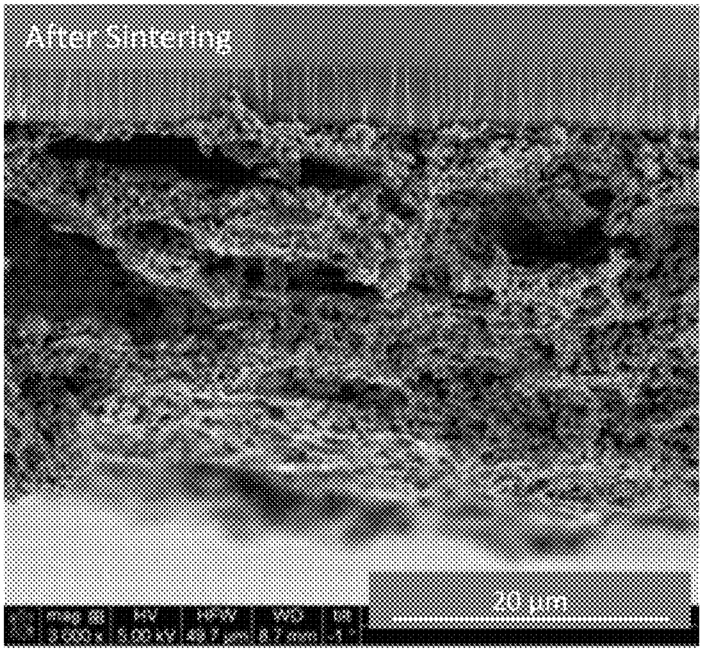
FIGS. 11A and 11B are images at 3,000× and 10,000× magnifications, respectively, of a cross-section of the composite described for FIG. 9A after the composite was sintered at 250° C. for 15 minutes.
Figure 11B:
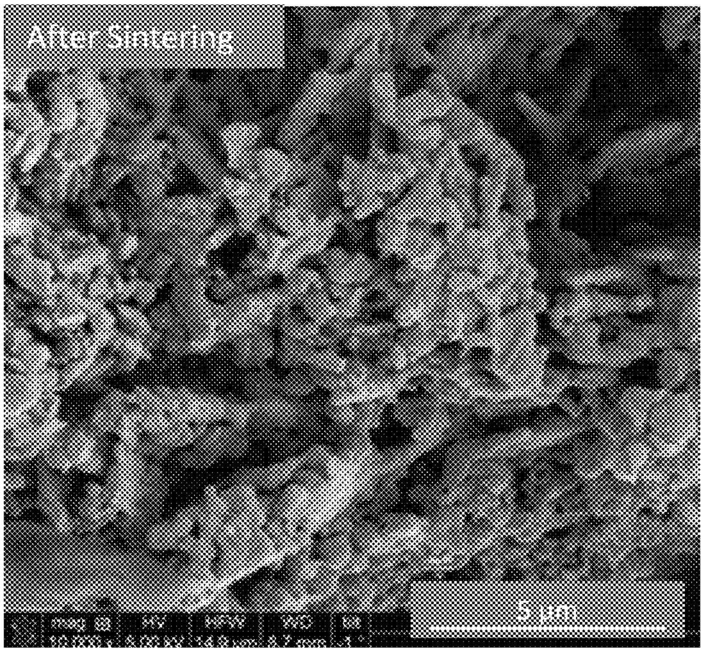

FIGS. 11A-11B shows images of cross-sections of S-1 after curing at 250° C. for 15 minutes at 3000× (FIG. 11A) and 10,000× (FIG. 11B).

Example 4—HNW in 7:3 HEMA:G4335 Resin

This example is directed to compositions with a blend of alternative curable polymers. The precursor solutions comprised a 7:3 ratio by weight of HEMA and G4335 as resin. The composition is a form of the following: 2.25 g AgFL, 0.75 g AgMP, 1.0 g AgNW (HNW), 1.0 g resin, 0.1 g silver acetate (2.5% of total Ag). UV dose was at 1.8 J/cm$^2$. The composite is referred to as S-13.

TABLE 10

| Ag Salt (wt %) | AgFL + AgMP (wt %) | AgNW (wt %) | Total Ag (wt %) | Curing Conditions | Resistivity (Ohm-cm) | Sheet Resistance Rs (Ohms/sq/ 25 micron) |
|---|---|---|---|---|---|---|
| 0 AgNW | 80 | 0 | 80 | UV + 10 min at 130° C. | $3.72 \times 10^{-4}$ | 0.149 |
| 0 Ag salt | 60 | 20 | 80 | UV + 10 min at 130° C. | $2.73 \times 10^{-4}$ | 0.109 |
| 2.5 AgAc | 60 | 20 | 81.6 | UV + 10 min at 130° C. | $5.04 \times 10^{-5}$ | 0.02 |
| 2.5 AgAc | 60 | 20 | 81.6 | UV + 30 min at 130° C. | $3.66 \times 10^{-5}$ | 0.015 |
| 2.5 AgAc | 60 | 20 | 81.6 | UV + 30 min at 150° C. | $6.31 \times 10^{-5}$ | 0.025 |

Figure 12:
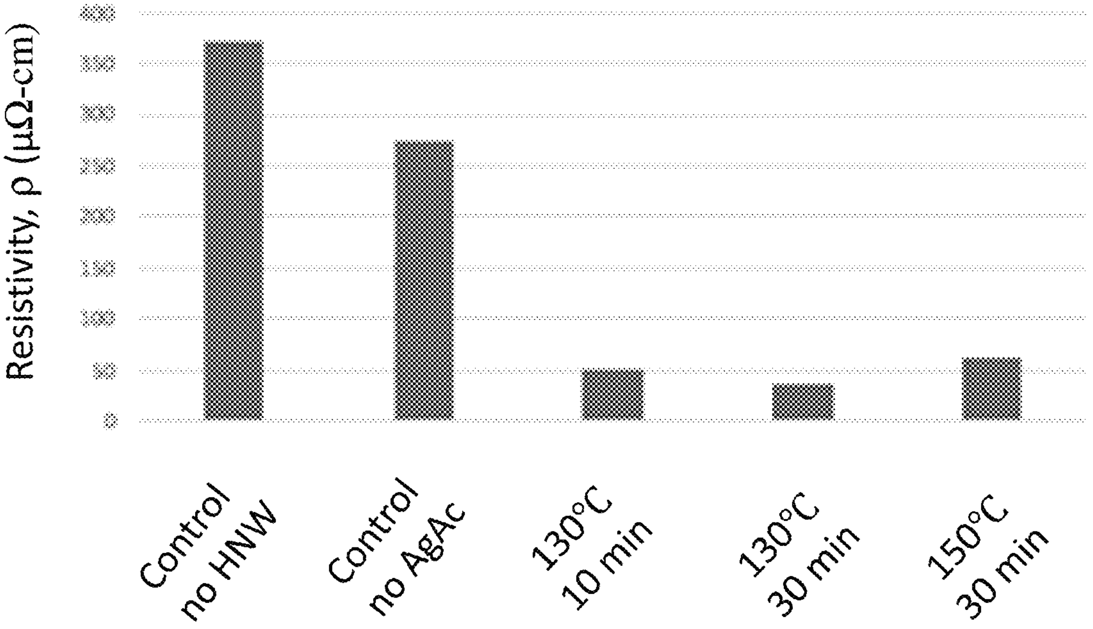
FIG. 12 is a bar graph showing resistivities for composites including about 20 wt % HNW, about 44 wt % AgFL, about 15 wt % AgMP and about 2.5 wt % AgTFA in a UV cured urethane acrylate polymer matrix.

Data suggest 130° C. gave better results as compared to 150° C. Good hardness and adhesion were observed. FIG. 12 is a bar graph showing resistivity for the different compositions.

Example 5—HNW and Silver Particulates in Epoxy Composites

Epoxy resin systems were used to prepare composites as shown in Table 11.

TABLE 11

| Component | Composite S-14 | Composite S-15 | Composite S-16 |
|---|---|---|---|
| HNW (g) | 1.6 | 1.6 | 1.67 |
| AgFL (g) | 4.8 | 4.9 | 4.9 |
| AgMP (g) | 1.6 | 1.6 | 1.6 |
| YX8000D (g) | 1.4 | — | — |
| Celloxide 2021P (g) | — | 1.4 | — |
| Epon 815C (g) | — | — | 1.4 |
| MHHPA (g) | 0.5 | 0.5 | 0.5 |
| EMI-24 (mg) | 0.1 | 0.1 | 0.1 |
| TEG (g) | 0.5 | 0.5 | 0.5 |

To the composites were added reducible silver compositions (dissolved in PG/TEG) and reducing agent additives (introduced by adding to reducible silver composition solutions) as shown in Table 12. Coatings were prepared using different curing temperatures and times and resistivities were measured. Results are shown in Table 12.

TABLE 12

| Composite | Salt (5 wt %) | Reducing Agent Additive (amount) | Resistivity (Ohm-cm) 120° C., 30 min | Resistivity (Ohm-cm) 150° C., 30 min | Resistivity (Ohm-cm) 150° C., 1 hr |
|---|---|---|---|---|---|
| S-14 | — | — | 0.48 | $3.9 \times 10^{-4}$ | — |
| S-14-TFA | AgTFA | — | OL | $9.9 \times 10^{-5}$ | — |
| S-14-Ac | AgAc | — | $1.7 \times 10^{-4}$ | $1.7 \times 10^{-4}$ | — |
| S-15 | — | — | 0.11 | OL | — |
| S-15-TFA | AgTFA | — | OL | $9.1 \times 10^{-5}$ | — |
| S-15-Ac | AgAc | — | $2.7 \times 10^{-4}$ | $1.3 \times 10^{-4}$ | — |
| S-16 | — | — | $1.1 \times 10^{-3}$ | $1.1 \times 10^{-3}$ | $9.6 \times 10^{-4}$ |
| S-16-TFA | AgTFA | — | $1.5 \times 10^{-4}$ | $4.3 \times 10^{-5}$ | N/A |
| S-16-TFA/FA | AgTFA | FA[1] [0.2 g] | OL | $6.4 \times 10^{-4}$ | $2.8 \times 10^{-4}$ |
| S-16-TFA/Am | AgTFA | Am[2] [0.3 g] | OL | OL | OL |
| S-16-TFA/FA/Am | AgTFA — | FA + Am[2] [0.3 g] | $3.5 \times 10^{-4}$ | $3.5 \times 10^{-4}$ | — |
| S-16-TFA/DMF | AgTFA | DMF[3] [0.2 g] | OL | OL | OL |
| S-16-HFB | AgHFB | — | $5.6 \times 10^{-3}$ | $1.15 \times 10^{-4}$ | — |
| S-16-HFB/FA | AgHFB | FA[1] [0.2 g] | $4 \times 10^{-4}$ | $2.7 \times 10^{-4}$ | — |
| S-16-Ac | AgOAc | — | $1.1 \times 10^{-4}$ | $9.3 \times 10^{-5}$ | — |
| S-16-Lac | AgLactate | — | $2.2 \times 10^{-4}$ | $1.5 \times 10^{-4}$ | — |
| S-16-SbF6 | AgSbF6 | — | 1.2 | OL | — |

[1]FA = formic acid;

[2]Am = ammonia 2M in EtOH;

[3]DMF = N,N-dimethylformamide

Results suggest that S-14 is a better system. AgTFA provided the best resistivity with thermally cured ECA formulated from different resins. S-16 does not appear to be a high performing system, but the effect of Ag composition is nevertheless demonstrated. Additional reducing agent did not enhance the effect of Ag composition.

Example 6—Effect of HNW Length in Epoxy Composites

Epoxy resin systems were used to prepare composites as shown in Table 13. Resin mix was with Epolead PB 3600, 150 mg+Denacol EX-612, 120 mg+EMI-24, 20 mg. 5 mg PVP was also added to Control in composite 12d. AgTFA was used at 5% silver of total Ag. Both PVP and AgTFA were added in dry powder form and mixed in with the resin to dissolve. AgNP used was 100 nm powder from SkySpring Nanomaterials. Results are shown in Table 14.

TABLE 13

| Composite | HNW | HNW (g) | AgNP (g) | AgTFA (mg) | Curing Conditions |
|---|---|---|---|---|---|
| S-17 (Control) | — | — | 1.8 | — | 30 min at 120° C. |
| S-18 | H-5 | 0.4 | 1.4 | — | 30 min at 120° C. |
| S-19 | H-2 | 0.4 | 1.4 | — | 30 min at 120° C. |
| S-20 | H-1 | 0.4 | 1.4 | — | 30 min at 120° C. |
| S-21 (Control) | — | — | 1.8 | 185 | 30 min at 120° C. + 15 min, 150° C. |
| S-22 | H-5 | 0.4 | 1.4 | 185 | 30 min at 120° C. + 15 min, 150° C. |
| S-23 | H-2 | 0.4 | 1.4 | 185 | 30 min at 120° C. + 15 min at 150° C. |
| S-24 | H-1 | 0.4 | 1.4 | 185 | 30 min at 120° C. + 15 min at 150° C. |

TABLE 14

| Composite | Resistivity (Ohm-cm) | Calculated Rs (Ohms/sq/ 25 micron) |
|---|---|---|
| S-17 (Control) | $2.2 \times 10^{-3}$ | 0.85 |
| S-18 | $4.2 \times 10^{-4}$ | 0.16 |
| S-19 | $8 \times 10^{-4}$ | 0.32 |
| S-20 | $6.7 \times 10^{-4}$ | 0.26 |
| S-21 (Control) | $7.7 \times 10^{-4}$ | 0.30 |
| S-22 | $1.6 \times 10^{-4}$ | 0.06 |
| S-23 | $1 \times 10^{-4}$ | 0.04 |
| S-24 | $2.2 \times 10^{-4}$ | 0.09 |

The silver salts resulted in significant decrease in resistivity. There was some variation based on silver nanowire length, but the trends were not definitive. In particular, with the silver salt, the lowest resistance was found with the 2 micron length silver nanowires, while without the silver salt, the 5 micron silver nanowire had the lowest resistivity.

Example 7—Effect of HNW of Different Lengths with Process Aid in Epoxy Formulation This example explored the results with different lengths of silver nanowires with a process aid. Specifically, a thinner (BC) was added as a process aid. AgNP and resin mix were the same as in the previous example.

Composite compositions and results are shown in Table 15.

TABLE 15

| Composite | HNW | HNW (g) | AgNP (g) | Thinner (g) | Resistivity (Ohm-cm) | Calculated Rs (Ohms/sq/ 25 micron) |
|---|---|---|---|---|---|---|
| S-25 (Control) | — | — | 3.6 | 1 | $2.2 \times 10^{-3}$ | 0.85 |
| S-26 | H-5 | 0.4 | 1.4 | 0.4 | $4.2 \times 10^{-4}$ | 0.16 |
| S-27 | H-2 | 0.4 | 1.4 | 0.6 | $8 \times 10^{-4}$ | 0.32 |
| S-28 | H-1 | 0.4 | 1.4 | 0.6 | $6.7 \times 10^{-4}$ | 0.26 |

Example 8—Commercial Paste Formulations

This Example explores the use of reducible silver compositions combined with various conductive particulates.

ACI Materials Commercial Conductive Paste

- S-29: First commercial conductive paste—reported composition components 65-85% Silver+1-10% Dimethyl Glutarate
- S-30: Second commercial conductive paste—reported composition components 40-55% Graphite+10-20% Carbon Black+5-10% 2,2-dimethyl-1,3-dioxolan-4-yl-methanol
- S-31: Third commercial conductive paste—reported composition components 50-70% Silver The conductive pastes were blade coated on 125 um PET and heated as indicated in the results tables. Sheet resistances were measured using a Suragus contactless resistance meter. Data are summarized in Table 16.

TABLE 16

| Paste | Thickness (cm) | Curing Conditions | Sheet Resistance (Ohms/sq) | Calculated Resistivity (Ohm-cm) | Calculated Rs (Ohms/sq/25 micron) |
|---|---|---|---|---|---|
| S-29 | 0.004 | no heating | 933 | 3.73 | 1492 |
| S-29 | " | 5 min at 120° C. | 0.0184 | $7.36 \times 10^{-5}$ | 0.029 |
| S-29 | " | 10 min at 120° C. | 0.0156 | $6.24 \times 10^{-5}$ | 0.025 |
| S-29 | 66 | 15 min at 120° C. | 0.0168 | $6.72 \times 10^{-5}$ | 0.027 |
| S-29 | " | 30 min at 120° C. | 0.0153 | $6.12 \times 10^{-5}$ | 0.024 |
| S-30 | 0.015 | no heating | >1000 | NA | — |
| S-30 | " | 5 min at 120° C. | 25.6074 | $3.84 \times 10^{-1}$ | 154 |
| S-30 | " | 10 min at 120° C. | 25.5376 | $3.83 \times 10^{-1}$ | 153 |
| S-30 | " | 15 min at 120° C. | 25.0703 | $3.76 \times 10^{-1}$ | 150 |
| S-30 | " | 30 min at 120° C. | 24.6536 | $3.70 \times 10^{-1}$ | 148 |
| S-31 | 0.008 | no heating | >1000 | NA | — |
| S-31 | " | 5 min at 120° C. | 0.1037 | $8.30 \times 10^{-4}$ | 0.332 |

TABLE 16-continued

| Paste | Thickness (cm) | Curing Conditions | Sheet Resistance (Ohms/sq) | Calculated Resistivity (Ohm-cm) | Calculated Rs (Ohms/sq/25 micron) |
|---|---|---|---|---|---|
| S-31 | " | 10 min at 120° C. | 0.1029 | $8.23 \times 10^{-4}$ | 0.329 |
| S-31 | " | 15 min at 120° C. | 0.1028 | $8.22 \times 10^{-4}$ | 0.329 |
| S-31 | " | 30 min at 120° C. | 0.1024 | $8.19 \times 10^{-4}$ | 0.328 |

Coatings of rectangular shape on glass slides were carried out with 30 micron spacers and processed similarly, and resistances across the length were measured and volume resistivities calculated. Results are given in Table 17. Paste S-29 seemed to give higher resistivity on glass than on PET.

TABLE 17

| Paste | Thickness (cm) | Curing Conditions | Resistance (Ohm) | Calculated Resistivity (Ohm-cm) | Calculated Rs (Ohms/sq/25 micron) |
|---|---|---|---|---|---|
| S-29 | 0.018 | 5 min at 120° C. | 0.186 | $2.01 \times 10^{-4}$ | 0.080 |
| S-29 | " | 10 min at 120° C. | 0.1703 | $1.84 \times 10^{-4}$ | 0.074 |
| S-29 | " | 15 min at 120° C. | 0.159 | $1.72 \times 10^{-4}$ | 0.069 |
| S-29 | " | 30 min at 120° C. | 0.1288 | $1.39 \times 10^{-4}$ | 0.056 |
| S-30 | 0.020 | 5 min at 120° C. | 185.2 | $2.22 \times 10^{-1}$ | 88.8 |
| S-30 | " | 10 min at 120° C. | 166.8 | $2.00 \times 10^{-1}$ | 80.0 |
| S-30 | " | 15 min at 120° C. | 176.8 | $2.12 \times 10^{-1}$ | 84.8 |
| S-30 | " | 30 min at 120° C. | 170.6 | $2.05 \times 10^{-1}$ | 82.0 |
| S-31 | 0.013 | 5 min at 120° C. | 1.2 | $9.36 \times 10^{-4}$ | 0.374 |
| S-31 | " | 10 min at 120° C. | 0.915 | $7.14 \times 10^{-4}$ | 0.286 |
| S-31 | " | 15 min at 120° C. | 0.986 | $7.69 \times 10^{-4}$ | 0.308 |
| S-31 | " | 30 min at 120° C. | 0.936 | $7.30 \times 10^{-4}$ | 0.292 |

Reducible silver composition was added to the silver based conductive pastes with the aid of a small amount of solvent. Only EtOH was found to be compatible with paste S-31, Table 18. The composite of S-31 with AgTFA/EtOH was coated on microscopic glass slide with a 30 micron spacer and the resistances after various times of heating at 120° C. were measured and results are shown in Table 19. Comparing to the raw S-31, AgTFA did increase conductivity more than 10×, although curing time becomes longer.

TABLE 18

| Paste | Amount of AgTFA (g) (5 wt % to Ag in paste) | Solvent | Amount of Solvent (g) | Compatibility |
|---|---|---|---|---|
| S-29, 2 g | 0.075 | EtOH | 0.1 | not compatible |
| " | 0.075 | TEG | 0.2 | not compatible |
| S-31, 2 g | 0.06 | EtOH | 0.08 | compatible |
| " | 0.06 | TEG | 0.16 | not compatible |

TABLE 19

| Time | Resistance (Ohm) | Resistivity (Ohm-cm) | Calculated Rs (Ohms/sq/25 micron) |
|---|---|---|---|
| 5 min | 35 | $5.04 \times 10^{-1}$ | 202 |
| 10 min | 32.5 | $4.68 \times 10^{-3}$ | 1.87 |
| 15 min | 2.35 | $3.38 \times 10^{-4}$ | 0.14 |
| 30 min | 0.189 | $2.72 \times 10^{-5}$ | 0.011 |
| 45 min | 0.110 | $1.58 \times 10^{-5}$ | 0.0063 |
| 24 hours | 0.102 | $1.47 \times 10^{-5}$ | 0.0059 |

Example 9—Effect of AgTFA on Resistivity with UV Curable Adhesives

AgFL, AgMP and optionally AgTFA were mixed with EtOH in a flask using vortex mixer, followed by sonication at 40 KHz for 1 hour. HNW dispersion in EtOH was added into the mixture and the flask gently shaken to mix the silver compositions. Monomer resin (V80300) was slowly added into the flask with gentle shaking and the mixture was further mixed with a vortex for 3 min. Afterwards the ethanol was removed using a rotovap with heating from a 40° C. water bath.

The resulting ECA paste was then coated onto a microscopic glass slide using 60 μm tape spacers using doctor blade technique. After coating the ECA coupons were UV cured (3.8 $J/cm^2$) and then heated at 120° C. for 30 minutes followed by an additional 30 min at 150° C. in a well-ventilated box oven.

Figure 13:
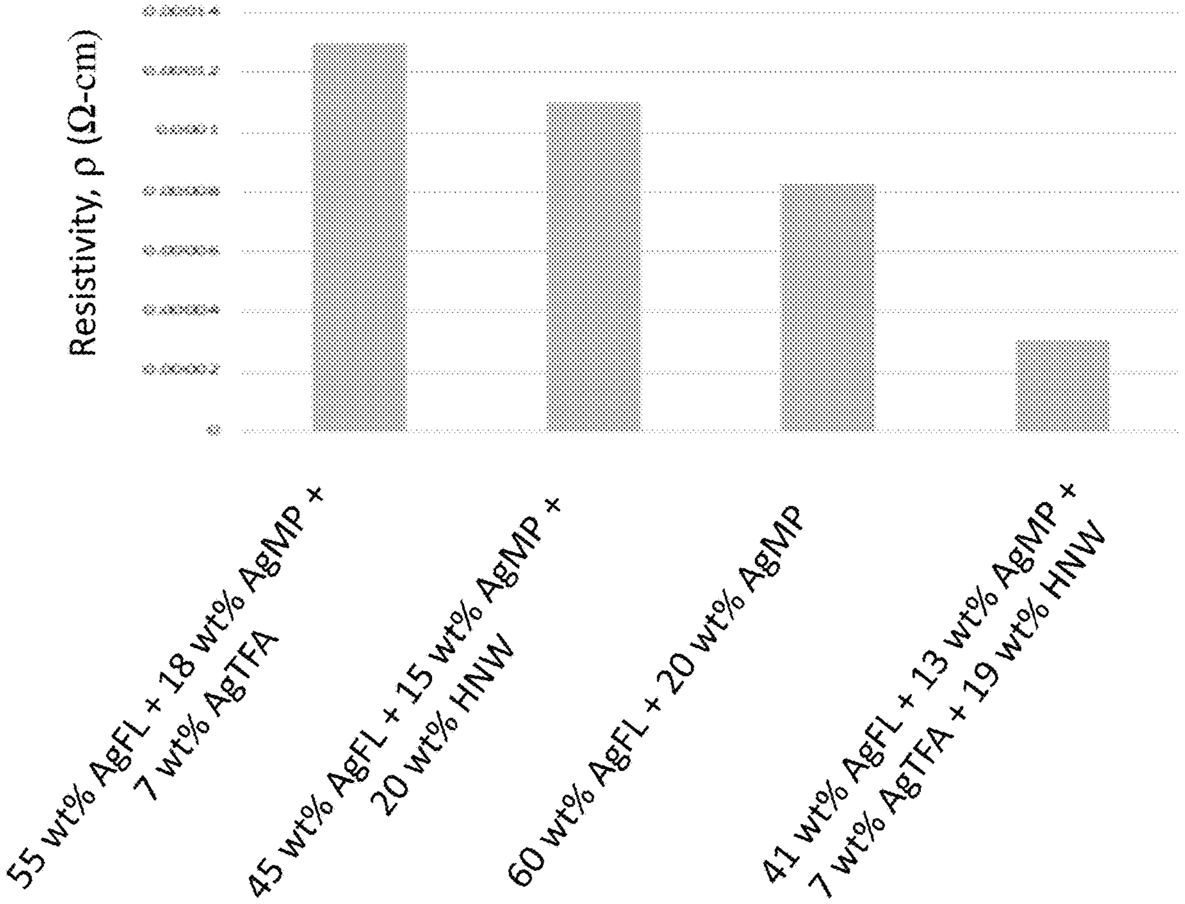
FIG. 13 is a bar graph showing resistivities for composites comprising combinations of about 20 wt % HNW, from about 40 wt % to 60 wt % AgFL, from about 10 wt % to about 20 wt % AgMP and about 7 wt % AgTFA in a UV cured modified acrylate polymer matrix.

Compositions and results are shown in Table 20. The resin was V80300 at 20 wt %. The thicknesses were about 40±0.5 microns. FIG. 13 shows a bar graph of resistivity as a function of composition.

TABLE 20

| Composite | HNW (wt %) | AgFL (wt %) | AgMP (wt %) | AgTFA (wt %) | Total Ag (wt %) | Resistivity (Ohm-cm) |
|---|---|---|---|---|---|---|
| S-32 | 0 | 60 | 20 | 0 | 80 | $8.3 \pm 1.2 \times 10^{-5}$ |
| S-33 | 0 | 54.6 | 18.2 | 7.2 | 80 | $1.3 \pm 0.3 \times 10^{-4}$ |
| S-34 | 20 | 45 | 15 | 0 | 80 | $1.1 \pm 0.2 \times 10^{-4}$ |
| S-35 | 18.6 | 40.7 | 13.5 | 7.2 | 80 | $3.1 \pm 0.7 \times 10^{-5}$ |

Example 10—Thermally Curable Epoxy Formulation with and without Reducible Silver Composition The epoxy resin system of EPON 815C with 2-ethyl-4-methyl imidazole as hardener was used.

Figure 14:
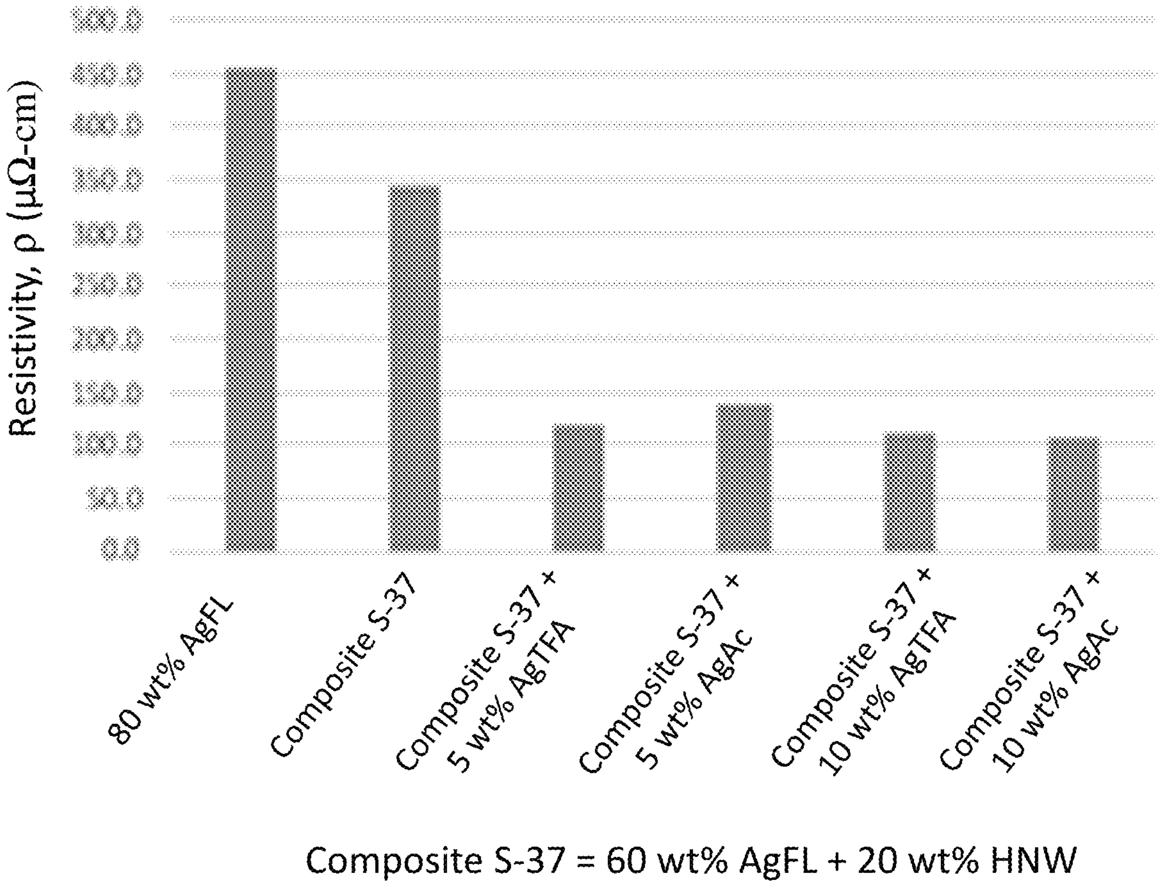
FIG. 14 is a bar graph showing resistivities for composites comprising combinations of about 20 wt % HNW, from about 60 wt % to 80 wt % AgFL, from about 5 wt % to about 10 wt % AgTFA and from about 5 wt % to about 10 wt % silver acetate (AgAc) in a thermally cured epoxy polymer matrix.

Compositions shown in Table 21 were prepared and cured at 150° C. for 30 minutes. Results are shown in Table 22. FIG. 14 shows a bar graph of resistivity as a function of composition.

TABLE 21

| Composition | Ag salt content % | HNW (wt %) | AgFL (wt %) | Ag from Ag salt (wt %) | Total Ag (wt %) |
|---|---|---|---|---|---|
| S-36 | 0 | 0 | 80 | 0 | 80 |
| S-37 | 0 | 20 | 60 | 0 | 80 |
| S-37-5TFA | 5% AgTFA | 20 | 60 | 2.4 | 82.4 |
| S-37-5Ac | 5% AgAc | 20 | 60 | 3.2 | 83.2 |
| S-37-10TFA | 10% AgTFA | 20 | 60 | 4.8 | 84.8 |
| S-37-10Ac | 10% AgAc | 20 | 60 | 6.4 | 86.4 |

TABLE 22

| Composition | Resistivity (Ohm-cm) | Calculated Rs (Ohms/sq/ 25 micron) |
|---|---|---|
| S-36 | $4.54 \times 10^{-4}$ | 0.182 |
| S-37 | $3.43 \times 10^{-4}$ | 0.137 |
| S-37-5TFA | $1.22 \times 10^{-4}$ | 0.049 |
| S-37-5Ac | $1.40 \times 10^{-4}$ | 0.056 |
| S-37-10TFA | $1.09 \times 10^{-4}$ | 0.044 |
| S-37-10Ac | $1.06 \times 10^{-4}$ | 0.042 |

Further Inventive Concepts

A1. A flowable precursor composition for forming an electrically conductive structure comprising:
- an organic precursor for a polymer matrix; and
- metal particulates comprising silver nanowires and metal particulates that are not nanowires, wherein the metal particulates comprise from about 5 wt % to about 90 wt % silver nanowires relative to a total weight of the metal particulates.

A2. The flowable precursor composition of inventive concept A1 wherein the metal partioculates that are not nanowires comprise silver flakes, silver particles or a blend thereof.

A3. The flowable precursor composition of inventive concept A1 wherein the metal particulates comprise from about 20 wt % to about 85 wt % silver nanowires relative to a total weight of the metal particulates.

A4. The flowable precursor composition of inventive concept A1 wherein the metal particulates comprise from about 2 wt % to about 45 wt % silver nanowires relative to a total weight of the metal particulates.

A5. The flowable precursor composition of inventive concept A1 wherein the composition has a total metal weight from about 50 wt % to about 95 wt % relative to the total weight of the composition.

A6. The flowable precursor composition of inventive concept A1 wherein the composition has a total metal weight from about 60 wt % to about 85 wt % relative to the total weight of the composition.

A7. The flowable precursor composition of inventive concept A1 wherein the silver nanowires have an average diameter from about 30 nm to about 100 nm and an average length from about 1 micron to about 100 microns.

A8. The flowable precursor composition of inventive concept A1 further comprising a reducible metal composition.

A9. The flowable precursor composition of inventive concept A8 wherein the reducible metal composition comprises silver acetate ($Ag(O_2CCH_3)$), silver trifluoroacetate ($Ag(O_2CCF_3)$), silver heptafluorobutyrate ($Ag(O_2CC_3F_7)$), silver lactate ($Ag(O_2CCH(OH)CH_3)$), silver hexafluoroantimonate ($AgSbF_6$), silver fluoride (AgF), silver tetrafluoroborate ($AgBF_4$), silver nitrate ($AgNO_3$), silver perchlorate ($AgClO_4$), silver hexafluorophosphate ($AgPF_6$), or mixtures thereof.

A10. The flowable precursor composition of inventive concept A8 wherein the reducible metal composition comprises one or more of silver acetate, silver trifluoroacetate, silver heptafluorobutyrate, silver lactate, silver tetrafluoroborate ($AgBF_4$), silver hexafluorophosphate or silver hexafluoroantimonate A11. The flowable precursor composition of inventive concept A8 wherein the composition comprises from about 0.5 wt % to about 40 wt % silver ions relative to a total metal weight of the composition.

A12. The flowable precursor composition of inventive concept A1 comprising from about 5 wt % to about 55 wt % precursor.

A13. The flowable precursor composition of inventive concept A1 comprising at least about 5 wt % of a volatile solvent.

A14. The flowable precursor composition of inventive concept A13 wherein the solvent comprises water, alcohols, glycols, amides, glycol ethers, polar aprotic solvent, or a mixture thereof.

A15. The flowable precursor composition of inventive concept A1 wherein the organic precursor comprises a dissolved polymer binder, a crosslinkable or polymerizable monomer, oligomer or polymer, or a mixture thereof.

A16. The flowable precursor composition of inventive concept A1 wherein the precursor comprises a (meth)acrylate monomer.

A17 The flowable precursor composition of inventive concept A1 wherein the precursor comprises a monomer having hydroxyl functional groups, a monomer comprising epoxy functional groups, a monomer comprising isocyanate functional groups, or mixtures thereof.

A18. The flowable precursor composition of inventive concept A1 wherein the precursor comprises a fluorinated aliphatic (meth)acrylate monomer, an aliphatic urethane acrylate monomer and an aliphatic (meth)acrylate monomer, an aliphatic urethane acrylate monomer having one or more terminal hydroxy groups, an aliphatic urethane acrylate monomer having one or more terminal epoxy groups, or a mixture thereof.

A19. The flowable precursor composition of inventive concept A1 wherein the precursor comprises an aliphatic ether comprising one or more epoxy groups; an acid anhydride and a monomer comprising one or more terminal epoxy groups; an acid anhydride and a monomer comprising bisphenol A and one or more terminal epoxy groups; an acid anhydride and a monomer comprising hydrogenated bisphenol A and one or more terminal epoxy groups; or a mixture thereof.

A20. The flowable precursor composition of inventive concept A1 wherein the precursor is thermally curable.

A21. The flowable precursor composition of inventive concept A1 wherein the precursor is UV curable.

B1. A composite electrically conductive material comprising a solid polymer matrix and at least about 45 wt % metal, wherein the metal comprises:

a1) features formed from metal particulates that are not nanowires and b1) features formed from silver nanowires, from deposited metal from a reduced metal composition, or from both; or a2) structures formed from silver nanowires and b2) deposited metal from reduced metal compositions.

B2. The composite electrically conductive material of inventive concept B1 wherein the solid polymer matrix comprises a chemically crosslinked polymer.

B3. The composite electrically conductive material of inventive concept B1 wherein the solid polymer matrix comprises a physically crosslinked polymer binder.

B4. The composite electrically conductive material of inventive concept B1 wherein the solid polymer matrix comprises a combination of physically crosslinked polymer and chemically crosslinked polymer.

B5. The composite electrically conductive material of inventive concept B1 wherein the solid polymer matrix comprises an acrylate polymer, a urethane polymer, an epoxy-based polymer, a silicone polymer, or a blend thereof.

B6. The composite electrically conductive material of inventive concept B1 having from about 50 wt % to about 95 wt % metal.

B7. The composite electrically conductive material of inventive concept B1 having from about 55 wt % to about 90 wt % metal.

B8. The composite electrically conductive material of inventive concept B1 comprising metal features formed from silver nanowires.

B9. The composite electrically conductive material of inventive concept B8 comprising metal features formed from reduced silver ions and no features formed from non-nanowire metal particulates.

B10. The composite electrically conductive material of inventive concept B8 comprising metal features formed from reduced silver ions and features formed from non-nanowire metal particulates.

B11. The composite electrically conductive material of inventive concept B8 comprising features formed from non-nanowire metal particulates and no metal features formed from reduced silver ions.

B12. The composite electrically conductive material of inventive concept B1 comprising features formed from non-nanowire metal particulates, metal features formed from reduced silver ions, and no metal features formed form silver nanowires.

B13. The composite electrically conductive material of inventive concept B1 comprising an adhesive polymer.

B14. The composite electrically conductive material of inventive concept B1 wherein the non-nanowire metal particulates comprise silver flakes.

B15. The composite electrically conductive material of inventive concept B1 wherein the non-nanowire metal particulates comprise silver particles.

B16. The composite electrically conductive material of inventive concept B1 having a resistivity of no more than about $5\times10^{-3}$ Ohm-cm.

B17. The composite electrically conductive material of inventive concept B1 having a resistivity from about $1\times10^{-4}$ Ohm-cm to about $5\times10^{-6}$ Ohm-cm.

C1. A method for forming a precursor composition for forming an electrically conductive composite material, the method comprising:

combining a) a polymer matrix precursor that comprises a crosslinkable polymer precursor, polymerizable monomers/oligomers, a dissolved polymer binder, or combination thereof, and b) a metal component provided as two or more of 1) metal particulates that are not nanowires, 2) silver nanowires, or 3) a reducible metal composition, to form the precursor composition, and wherein the precursor composition comprises at least about 45 wt % total metal in all forms and wherein if the metal is provided as only silver nanowire and a reducible metal composition, the polymer matrix comprises at least 2 wt % of the polymer matrix composition following curing.

C2. The method of inventive concept C1 wherein the silver metal nanowires are dispersed in a dispersant prior to combining.

C3. The method of inventive concept C1 wherein the reducible metal composition is dissolved in a solvent prior to combining.

C4. The method of inventive concept C1 wherein combining comprises mixing in a mechanical mixer to form a homogenous precursor composition.

C5. The method of inventive concept C4 wherein the homogenous precursor composition is flowable.

C6. The method of inventive concept C4 wherein the homogenous precursor composition can be deposited by extrusion, spray coating, dispensing, printing, or slot coating.

C7. The method of inventive concept C1 wherein the precursor composition comprises from about 5 wt % to about 55 wt % polymer matrix precursors.

C8. The method of inventive concept C1 wherein combining further comprises incorporating from about 5 wt % to about 45 wt % volatile solvent.

C9. The method of inventive concept C8 wherein the solvent comprises water, alcohols, glycols, amides, glycol ethers, polar aprotic solvent, or a mixture thereof.

C10. The method of inventive concept C1 wherein the metal component comprises from about 20 wt % to about 80 wt % silver nanowires.

C11. The method of inventive concept C1 wherein the metal particulates that are not silver nanowires comprise silver flakes.

C12. The method of inventive concept C1 wherein the metal particulates that are not silver nanowires comprise silver particles.

C13. The method of inventive concept C1 wherein the metal component comprises from about 0.5 wt % to about 40 wt % silver ions relative to the total metal weight which is dissolved in a solvent prior to combining.

C14. The method of inventive concept C1 wherein the precursor for the polymer matrix precursor comprises a (meth)acrylate monomer.

C15. The method of inventive concept C1 wherein the precursor for the polymer matrix precursor comprises, hydroxyl functional groups, epoxy functional groups, urethane precursor, epoxy groups, vinyl groups, silicone, or mixtures thereof.

C16. The method of inventive concept C1 wherein the precursor for the polymer matrix precursor comprises a fluorinated aliphatic (meth)acrylate monomer, an aliphatic urethane acrylate monomer, or a mixture thereof.

C17. The method of inventive concept C1 wherein the precursor for the polymer matrix precursor comprises an aliphatic ether comprising two or more terminal epoxy groups; an acid anhydride and an aliphatic monomer comprising two or more terminal epoxy group; an aliphatic monomer comprising two or more terminal epoxy groups derived from hydrogenated bisphenol A; a hydrogenated bisphenol A monomer comprising two or more terminal epoxy groups; or a mixture thereof.

C18. The method of inventive concept C1 wherein the precursor for the polymer matrix precursor is thermally curable.

C19. The method of inventive concept C1 wherein the precursor for the polymer matrix precursor is UV curable.

C20. A method for forming a deposit of a precursor for an electrically conductive composite, the method comprising depositing the precursor composition formed according to the method of inventive concept C1.

C21. The method of inventive concept C20 wherein the cured electrically conductive composite comprise at least about 8.5 wt % polymer matrix.

D1. A method for forming a composite material having high electrical conductivity and organic polymer and metal constituents, the method comprising:

curing a deposited composition to drive reduction of silver ions to form silver metal, wherein the deposited material is a precursor composition comprising polymer precursors, silver particulates, and dissolved silver composition and wherein curing comprises application of heat, UV radiation or both for sufficient time to reduce the silver ions to silver metal and decrease resistivity by at least about 25%.

D2. The method of inventive concept D1 wherein curing comprises heating.

D3. The method of inventive concept D2 wherein heating is performed in an oven at a temperature from about 90° C. to about 250° C. for from 5 minutes to 4 hours.

D4. The method of inventive concept D2 wherein the heat crosslinks an organic polymer.

D5. The method of inventive concept D1 wherein curing comprises UV irradiation.

D6. The method of inventive concept D1 wherein curing comprises irradiation with a pulsed light source.

D7. The method of inventive concept D1 wherein the silver ions are associated with a reducible metal composition comprising silver acetate ($Ag(O_2CCH_3)$), silver trifluoroacetate ($Ag(O_2CCF_3)$), silver heptafluorobutyrate ($Ag(O_2CC_3F_7)$), silver lactate ($Ag(O_2CCH(OH)CH_3)$), silver hexafluoroantimonate ($AgSbF_6$), silver fluoride (AgF), silver tetrafluoroborate ($AgBF_4$), silver nitrate ($AgNO_3$), silver perchlorate ($AgClO_4$), silver hexafluorophosphate ($AgPF_6$), or mixtures thereof.

D8. The method of inventive concept D1 wherein the deposited composition further comprises solvent, which is removed during curing.

D9. The method of inventive concept D1 wherein the deposited composition further comprises a reducing agent to facilitate reduction of silver ions during curing.

D10. The method of inventive concept D1 wherein the silver ions are associated with a reducible metal composition comprising one or more of silver acetate, silver trifluoroacetate, silver heptafluorobutyrate, silver lactate, silver hexafluorophosphate or silver hexafluoroantimonate.

D11. The method of inventive concept D1 wherein the deposited composition comprises from about 0.5 wt % to about 40 wt % silver ions relative to the total metal weight.

D12. The method of inventive concept D1 wherein the deposited composition comprises from about 5 wt % to about 55 wt % polymer precursors.

D13. The method of inventive concept D1 wherein the deposited composition comprises at least about 5 wt % of a volatile solvent.

D14. The method of inventive concept D1 wherein the deposited composition comprises a precursor for a polymer matrix comprising a dissolved polymer binder, a crosslinkable or polymerizable monomer, oligomer or polymer, or a mixture thereof.

D15. The method of inventive concept D14 wherein the precursor for the polymer matrix comprises a (meth)acrylate monomer.

D16. The method of inventive concept D14 wherein the precursor for the polymer matrix comprises, hydroxyl functional groups, epoxy functional groups, urethane precursor, epoxy groups, vinyl groups, silicone, or mixtures thereof.

D17. The method of inventive concept D14 wherein the precursor for the polymer matrix comprises a fluorinated aliphatic (meth)acrylate monomer, an aliphatic urethane acrylate monomer comprises one or more terminal hydroxy groups, one or more terminal epoxy groups or a blend thereof, or a mixture thereof.

D18. The method of inventive concept D14 wherein the precursor for the polymer matrix comprises an aliphatic ether comprising two or more terminal epoxy groups; an acid anhydride and an aliphatic monomer comprising two or more terminal epoxy group; an aliphatic monomer comprising two or more terminal epoxy groups derived from hydrogenated bisphenol A; a hydrogenated bisphenol A monomer comprising two or more terminal epoxy groups; or a mixture thereof.

D19. The method of inventive concept D1 further comprising forming the precursor by a method comprising:

combining a) a polymer matrix precursor that comprises a crosslinkable polymer precursor, polymerizable monomers/oligomers, a dissolved polymer binder, or combination thereof, and b) a metal component provided as two or more of 1) metal particulates that are not nanowires, 2) silver nanowires, or 3) a reducible metal composition, to form the precursor composition, and wherein the precursor composition comprises at least about 45 wt % total metal in all forms and wherein if the metal is provided as only silver nanowire and a reducible metal composition, the polymer matrix comprises at least 8.5 wt % of the polymer matrix precursor composition following curing.

D20. The method of inventive concept D19 wherein combining comprises mixing in a mechanical mixer to form a homogenous precursor composition and wherein the homogenous precursor composition is flowable.

D21. The method of inventive concept D1 wherein the decrease in resistivity is by at least about 50%.

D22. The method of inventive concept D1 wherein the resistivity of the cured composite composition is no more than about $1\times10^{-4}$ Ohm-cm.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein. To the extent that specific structures, compositions and/or processes are described herein with components, elements, ingredients or other partitions, it is to be understand that the disclosure herein covers the specific embodiments, embodiments comprising the specific components, elements, ingredients, other partitions or combinations thereof as well as embodiments consisting essentially of such specific components, ingredients or other partitions or combinations thereof that can include additional features that do not change the fundamental nature of the subject matter, as suggested in the discussion, unless otherwise specifically indicated. The use of the term "about" herein refers to expected uncertainties in the associated values as would be understood in the particular context by a person of ordinary skill in the art.

What is claimed is:

1. A flowable precursor composition for forming an electrically conductive material comprising:

at least about 2.0 wt % of an organic precursor for forming a polymer matrix;

metal particulates comprising silver nanowires and one or both of silver flakes and silver particles; and reducible metal composition, wherein a total metal weight is at least about 45 wt % relative to a total weight of the composition.

2. The flowable precursor composition of claim 1 wherein the reducible metal composition is a reducible silver composition.

3. The flowable precursor composition of claim 2 wherein the reducible silver composition comprises silver acetate ($Ag(O_2CCH_3)$), silver trifluoroacetate ($Ag(O_2CCF_3)$), silver heptafluorobutyrate ($Ag(O_2CC_3F_7)$), silver lactate ($Ag(O_2CCH(OH)CH_3)$), silver hexafluoroantimonate ($AgSbF_6$), silver fluoride (AgF), silver tetrafluoroborate ($AgBF_4$), silver nitrate ($AgNO_3$), silver perchlorate ($AgClO_4$), silver hexafluorophosphate ($AgPF_6$), or mixtures thereof.

4. The flowable precursor composition of claim 2 wherein the precursor composition comprises from about 0.5 wt % to about 40 wt % silver ions relative to the total metal weight.

5. The flowable precursor composition of claim 1 wherein the reducible metal composition comprises one or more of silver acetate, silver trifluoroacetate, silver heptafluorobutyrate, silver lactate, silver tetrafluoroborate ($AgBF_4$), silver hexafluorophosphate or silver hexafluoroantimonate.

6. The flowable precursor composition of claim 1 wherein the organic precursor comprises a (meth)acrylate monomer.

7. The flowable precursor composition of claim 1 wherein the organic precursor comprises an aliphatic urethane acrylate monomer and an aliphatic (meth)acrylate monomer.

8. The flowable precursor composition of claim 7 wherein the aliphatic urethane acrylate monomer comprises a monomer having one or more terminal hydroxy groups, a monomer having one or more terminal epoxy groups, or a combination thereof.

9. The flowable precursor composition of claim 7 wherein the aliphatic urethane acrylate monomer comprises a monomer having one or more terminal hydroxy groups and the aliphatic (meth)acrylate monomer comprises a monomer having one or more hydroxy groups.

10. The flowable precursor composition of claim 1 wherein the organic precursor comprises a fluorinated aliphatic (meth)acrylate monomer.

11. The flowable precursor composition of claim 1 wherein the organic precursor comprises an epoxidized polybutadiene monomer having one or more terminal hydroxy groups.

12. The flowable precursor composition of claim 11 wherein the organic precursor further comprises an aliphatic ether comprising one or more epoxy groups.

13. The flowable precursor composition of claim 1 wherein the organic precursor comprises an acid anhydride and a monomer comprising one or more terminal epoxy groups.

14. The flowable precursor composition of claim 13 wherein the monomer comprising one or more terminal epoxy groups is derived from bisphenol A.

15. The flowable precursor composition of claim 13 wherein the monomer comprising one or more terminal epoxy groups is derived from hydrogenated bisphenol A.

16. The flowable precursor composition of claim 1 wherein the composition comprises the silver flakes, and the silver flakes have an average particle diameter from about 1 micron to 20 microns.

17. The flowable precursor composition of claim 1 wherein the composition comprises from about 30 wt % to about 50 wt % of the silver flakes relative to a total weight of the composition.

18. The flowable precursor composition of claim 1 wherein, relative to the total weight of the composition, the composition comprises from about 30 wt % to about 50 wt % of the silver flakes and from about 5 wt % to about 20 wt % of the silver particles.

19. The flowable precursor composition of claim 18 wherein the silver particles have an average particle diameter less than about 5 microns.

20. The flowable precursor composition of claim 18 wherein the silver particles have an average particle diameter less than about 200 nanometers.

21. The flowable precursor composition of claim 1 wherein, relative to a total weight of the composition, the composition comprises from about 5 wt % to about 80 wt % silver nanowires and at least about 8.5 wt % organic precursor.

22. The flowable precursor composition of claim 21 wherein the silver nanowires have an average length of less than about 10 microns and an aspect ratio of at least about 10.

23. The flowable precursor composition of claim 1 wherein, relative to a total weight of the composition, the composition comprises from about 5 wt % to about 50 wt % organic precursor and at least about 40 wt % metal particulates.

24. The flowable precursor composition of claim 1 comprising at least about 5 wt % of a volatile solvent relative to a total weight of the composition.

25. The flowable precursor composition of claim 24 wherein the solvent comprises water, alcohols, glycols, amides, glycol ethers, polar aprotic solvent, or a mixture thereof.

26. The flowable precursor composition of claim 1 wherein the organic precursor is thermally curable.

27. The flowable precursor composition of claim 1 wherein the organic precursor is UV curable.

* * * * *